United States Patent
Wong

(10) Patent No.: US 9,336,402 B2
(45) Date of Patent: May 10, 2016

(54) SECURE DATA IN REMOVABLE STORAGE DEVICES VIA ENCRYPTION TOKEN(S)

(75) Inventor: Duncan S. Wong, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 320 days.

(21) Appl. No.: 13/821,215

(22) PCT Filed: Sep. 13, 2010

(86) PCT No.: PCT/CN2010/001397
§ 371 (c)(1),
(2), (4) Date: Mar. 6, 2013

(87) PCT Pub. No.: WO2012/034250
PCT Pub. Date: Mar. 22, 2012

(65) Prior Publication Data
US 2013/0167228 A1    Jun. 27, 2013

(51) Int. Cl.
*G06F 21/62* (2013.01)
*G06F 21/34* (2013.01)
*G06F 21/78* (2013.01)

(52) U.S. Cl.
CPC .............. *G06F 21/62* (2013.01); *G06F 21/34* (2013.01); *G06F 21/78* (2013.01); *G06F 2221/2139* (2013.01)

(58) Field of Classification Search
USPC ............................................................ 726/19
See application file for complete search history.

(56) References Cited

U.S. PATENT DOCUMENTS

| 2009/0024416 | A1* | 1/2009 | McLaughlin | ......... G06F 19/322 705/3 |
| 2009/0187770 | A1* | 7/2009 | Cao et al. | ....................... 713/193 |
| 2009/0249464 | A1* | 10/2009 | Chang et al. | ..................... 726/11 |
| 2010/0185808 | A1* | 7/2010 | Yu et al. | ......................... 711/103 |
| 2010/0212012 | A1* | 8/2010 | Touboul et al. | .................. 726/23 |

FOREIGN PATENT DOCUMENTS

| CN | 101030174 A | 9/2007 |
| CN | 101044490 A | 9/2007 |
| CN | 100464313 C | 2/2009 |
| WO | 2009073144 A2 | 6/2009 |

OTHER PUBLICATIONS

International Search Report dated Jun. 23, 2011 for International Patent Application No. PCT/CN2010/001397, 2 pages.

* cited by examiner

*Primary Examiner* — Tu Nguyen
(74) *Attorney, Agent, or Firm* — Amin, Turocy & Watson, LLP

(57) ABSTRACT

Systems, methods, and devices that secure data on removable storage devices are presented. A token component can interface with a communication port on a host device. One or more removable storage devices can interface with one or more other communication ports on the host device. The token component includes a security component that, when interfaced with the host device, is employed to automatically and simultaneously enable access, encrypt data being stored in, and decrypt data being retrieved from the removable storage devices. When the token component is not interfaced with the host device, the removable storage devices are secured so that they cannot be accessed and data stored thereon cannot be retrieved and decrypted. A user optionally can utilize a password, which can be entered when the token component is interfaced with the host device, to facilitate controlling access to the removable storage devices and data encryption/decryption.

20 Claims, 11 Drawing Sheets

SECURE DATA IN REMOVABLE STORAGE DEVICES VIA ENCRYPTION TOKEN(S)

CROSS-REFERENCE TO RELATED APPLICATION

The subject application is a US national stage application of PCT Application Serial No. PCT/CN2010/001397, filed Sep. 13, 2010, and entitled "SECURE DATA IN REMOVABLE STORAGE DEVICES VIA ENCRYPTION TOKEN(S)," the disclosure of which is incorporated herein by reference in its entirety.

TECHNICAL FIELD

The subject disclosure relates generally to data communication and storage, and in particular, to systems, methods, and devices that employ an encryption token to secure data.

BACKGROUND OF THE INVENTION

Data security is a paramount concern for many users of electronic devices, such as computers. Many users store data, not only in internal storage, but also on removable storage devices (e.g., removable or external flash drives) due in part to the portability and convenience of the removable storage devices. Many users often store sensitive information, including, for example, confidential and/or valuable information (e.g., personal information, financial records, intellectual property, etc.), on removable storage devices, wherein such users can desire that their information be secured from undesired and/or unauthorized access by other users. For instance, a user's removable storage device may be lost or stolen, and, if the information is not desirably secured on the removable storage device, an unauthorized entity may obtain possession of the removable storage device and access the user's information stored therein.

Conventionally, there have been attempts to secure data on Universal Serial Bus (USB) flash drives, wherein data being stored in the USB flash drive can be encrypted and secured, and wherein a password is provided to the USB flash drive in order to access and decrypt the data stored on the USB flash drive. One drawback to securing data based on a password is that the password can be hacked at least eventually, particularly when the entity attempting to access the data stored on the drive is able to possess the drive for a significant period of time. Other types of solutions include using smart-card-based or biometric-based data encryption to secure data stored on a USB flash drive. One drawback of such solutions is that an undesirable amount (e.g., heavy) user intervention is required to operate the data security aspects of these types of solutions. Another drawback is that such solutions do not allow for simultaneously accessing of data stored on a USB flash device, automatically converting a USB flash drive to a secured encryption removable storage device, and automatically mounting the secured encryption removable storage device.

Accordingly, today, there is no way to reliably secure data stored on a removable storage device without requiring the user to provide a password in order to access and encrypt/decrypt data on the removable storage device. Moreover, conventional data security solutions (e.g., solutions using smart-card-based or biometric-based encryption) that secure data in a removable storage device are inconvenient.

The above-described deficiencies of today's data security systems for removable storage are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY OF THE INVENTION

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

The disclosed subject matter relates to systems, methods, and devices that can secure data associated with removable storage devices in accordance with various embodiments and aspects disclosed herein. In accordance with various aspects, a token component can be employed to facilitate controlling access to, and data encryption/decryption associated with, one or more storage devices (e.g., removable or external storage devices) associated with (e.g., connected to or interfaced with) a host device (e.g., a computer, a netbook, an electronic reading device, a personal digital assistant (PDA), a set-top box, a mobile phone, an electronic gaming console, etc.). When desired, the token component can be interfaced with (e.g., communicatively connected via a wired connection to) a communication port (e.g., USB port, FireWire port) on the host device to facilitate securing other electronic devices, such as removable storage devices, that can be associated with the host device. As desired, one or more removable storage devices can be interfaced with (e.g., communicatively connected via a wired or wireless connection to) one or more other communication ports on the host device.

In another aspect, the token component can include a security component that, when the token component is interfaced with the host device, can be employed to automatically and simultaneously control (e.g., enable, disable) access, encrypt data being stored in, and decrypt data being retrieved from the one or more removable storage devices interfaced with the host device. When the token component is connected to the host device, the token component can automatically and/or simultaneously examine all drives or ports on the host device, identify removable storage devices that are connected to the host device and are empty (e.g., no files, such as a master key file, stored thereon), generate or retrieve respective master key files and associated master keys of removable storage devices, generate a list of empty removable storage devices, create secure volume files for each of the removable storage devices, generate a list of removable storage devices that have secure volume files, and mount the removable storage devices as real disks on the host device. With the removable storage devices mounted as real disks on the host device, data can be written to, read from, or erased from the removable storage devices, wherein the token component can facilitate encrypting the data being written and decrypting data being read from the removable storage devices, while the token component is connected to the host device. When the token component is not interfaced with the host device (e.g., when the token component is disconnected from the host device), the one or more removable storage devices can be secured so that they cannot be accessed by the host device or other host device, and data stored in the one or more removable storage devices cannot be retrieved and decrypted. In an aspect, as desired, the token component can be utilized without requiring a password be input to the token component or the host device with which the token component is interfaced (e.g., connected).

In still another aspect, a user optionally can utilize a password, which can be entered when the token component is interfaced with the host device, to facilitate controlling access to the removable storage devices and data encryption/decryption. Use of a password can provide additional security for the removable storage devices and data associated therewith, in addition to the other security features provided by the token component, as more fully disclosed herein.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION OF THE PREFERRED EMBODIMENTS

Figure 1:
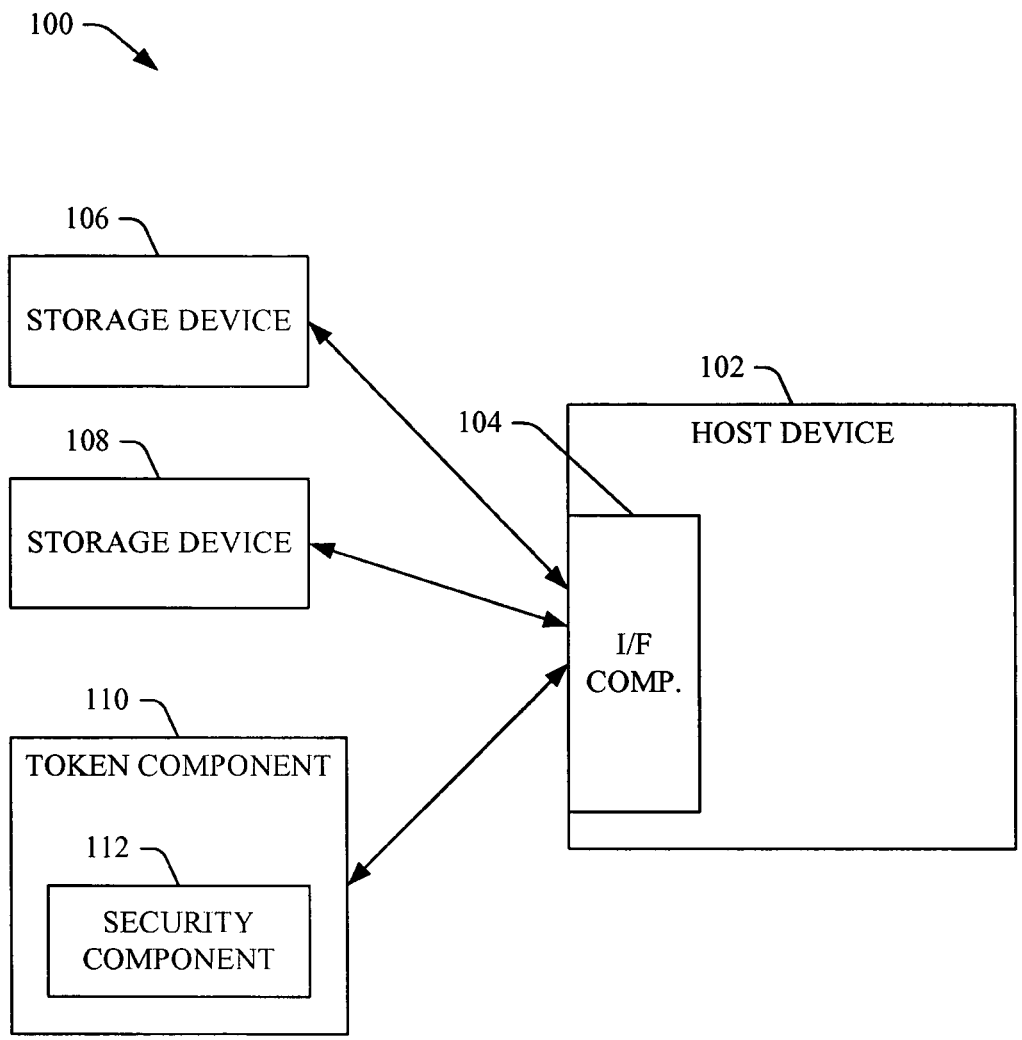
FIG. 1 illustrates a block diagram of an example system that can secure data associated with removable storage devices in accordance with various embodiments and aspects disclosed herein.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Conventionally, there have been attempts to secure data on storage devices (e.g., removable storage devices), such as Universal Serial Bus (USB) flash drives, wherein data being stored in the storage device can be encrypted and secured, and wherein it is necessary to provide a password to the USB flash drive in order to access and decrypt the data stored on the USB flash drive. One drawback to securing data based on a password is that the password can be hacked. Other types of solutions include using smart-card-based or biometric-based data encryption to secure data stored on a USB flash drive. However, a drawback of such solutions is that an undesirable amount (e.g., heavy) user intervention is required to operate the data security aspects of these types of solutions. Another drawback is that such solutions do not allow for simultaneously accessing of data stored on the storage device, automatically converting the storage device to a secured encryption removable storage device, and automatically mounting the secured encryption removable storage device.

To that end, systems, methods, and devices that can secure data associated with removable storage devices are presented. A token component can interface with a communication port on a host device, wherein the token component can be connected to or disconnected from the communication port of the host device, when desired. One or more removable storage devices can interface with one or more other communication ports on the host device, wherein the one or more removable storage devices can be connected to or removed from the communication port(s) of the host device, when desired. The token component can include a security component that, when the token component is interfaced with (e.g., connected to) the host device, is employed to automatically and simultaneously mount respective secured volume files for removable storage devices connected to the host device, and control or enable access, encrypt data being stored in, and decrypt data being retrieved from the removable storage devices. When the token component is not interfaced with (e.g., id disconnected from) the host device, the removable storage devices are secured such that they cannot be accessed and data stored thereon cannot be retrieved and decrypted. A user optionally can utilize a password, which can be entered when the token component is interfaced with the host device, to facilitate controlling access to the removable storage devices and data encryption/decryption.

FIG. 1 illustrates a block diagram of an example system 100 that can secure data associated with removable storage devices in accordance with various embodiments and aspects disclosed herein. In an aspect, the system 100 can include a host device 102, which can be an electronic device, such as, for example, a computer, a mobile phone (e.g., cellular phone, smart phone), a netbook, a personal digital assistant (PDA), an electronic reading device, a set-top box, an Internet Protocol Television (IPTV), an electronic gaming console, etc., that can be used to process, display, present, or store information and/or provide other desired features or functionality.

The host device 102 can comprise an interface component (I/F Comp.) 104 that can include one or more communication ports (e.g., wired communication port, wireless communication port) to which one or more storage devices (e.g., removable storage devices or peripheral storage devices), such as storage devices 106 and/or 108, can be connected to the interface component 104 via a wired or wireless connection, and disconnected or removed, when desired. The one or more storage devices (e.g., 106, 108) can comprise removable storage devices, such as, for example, flash drives (e.g., USB flash memory drive, FireWire flash memory drive, etc.) or other types of storage drives comprising nonvolatile memory. The one or more communication ports of the interface component 104 can be, for example, a Universal Serial Bus (USB) port(s), an IEEE 1394-type port (e.g., FireWire port), or other desired type of communication port (e.g., other type of serial or parallel communication port). As desired, one or more storage devices (e.g., 106, 108) can be connected (e.g., indirectly connected) to the interface component 104 via a hub (e.g., USB hub), or multiple storage devices (e.g., storage devices with a FireWire input connector and a FireWire output or throughput connector) can be daisy-chained together wherein one of the storage devices at the end of the daisy chain can be connected to the interface component 104. In an aspect, a wireless communication connection can be established between a storage device (e.g., 106, 108) and the host device 102 using a Wi-Fi, Wi-Max, Bluetooth, or cellular wireless technology, for example.

The one or more storage devices (e.g., 106, 108) can be employed to receive, store, and/or provide data. For instance, in accordance with security policies and protocols, such as more fully disclosed herein, a storage device (e.g., 106, 108) can receive data from or provide data to the host device 102 via the interface component 104 when the storage device (e.g., 106, 108) is connected to the host device 102 via the interface component 104. In an aspect, a storage device (e.g., 106, 108) can comprise, for example, nonvolatile and/or volatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (NVRAM) (e.g., ferroelectric RAM (FeRAM)). Volatile memory can include random access memory (RAM), which can act as external cache memory or buffer memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In an aspect, the system 100 can include a token component 110 that can control access to, and can secure data associated with, the one or more storage devices (e.g., 106, 108). When desired, the token component 110 can comprise a desired interface component (not shown in FIG. 1) and can interface with the interface component 104 of the host device 102 using a communication port (e.g., USB port, FireWire port, or other desired type of port) associated with the interface component 104. To facilitate controlling access to, and securing data associated with, the one or more storage devices (e.g., 106, 108), when desired, the token component 110 can be associated with (e.g., physically and communicatively connected to) the interface component 104 of the host device 102, wherein the token component 110 can essentially act or function as a key to control data access and data encryption/decryption. In an aspect, if the token component 110 includes a first type of interface (e.g., USB interface), but desires to interface with a different type of interface (e.g., FireWire interface), an interface adapter (not shown) can be connected between the first type of interface and the different type of interface to facilitate interfacing (e.g., connecting) the token component 110 to the interface component 104. In an embodiment, the token component 110 itself also can be a storage device that can be used to store desired user data, in addition to providing the security functions to itself and other storage devices, as more fully disclosed herein. In accordance with an aspect, as desired, the token component 110 can be utilized without requiring a password be input to the token component 110 or the host device 102 with which the token component 110 is interfaced (e.g., connected).

In another aspect, a user optionally can utilize authentication credentials (e.g., password, passphrase, personal identification number (PIN), etc.) with the token component 110. For instance, the token component 110 can employ desired authentication algorithm(s) and protocol(s) that can be used to authenticate a user attempting to access the token component 110 and/or removable storage devices (e.g., 106, 108) being secured by the token component 110. The authentication credentials can be entered by a user into the host device 102 (or into token component 110 directly when the token component 110 has a suitable interface) when the token component 110 is interfaced with (e.g., connected to) the host device 102, to facilitate controlling access to the removable storage devices (e.g., 106, 108) and data encryption/decryption. Use of authentication credentials, and authentication algorithms and protocols, can provide additional security for the removable storage devices and data associated therewith, in addition to the other security features provided by the token component 110, as more fully disclosed herein.

In another aspect, the token component 110 can include a security component 112 that can facilitate controlling access to, and securing data associated with, the one or more storage devices (e.g., 106, 108). When desired, a desired storage device(s) (e.g., 106, 108) and the token component 110 each can be connected to the host device 102 via the interface component 104. The host device 102 can recognize that the token component 110 is connected to the interface component 104 of the host device 102, and the token component 110 can recognize that the host device 102 is connected to the token component 110. The host device 102 and/or security component 112 can execute an application (e.g., a software application), which can be part of the security component 112 and stored on the token component 110 and/or host device 102, wherein the application can be used to facilitate controlling access by the host device 102 to the desired storage device(s) (e.g., 106, 108) and/or encryption or decryption of data being stored in or retrieved from the desired storage device(s) by the host device 102, in addition to other functions that can be facilitated by the application. In an aspect, the application can be invoked automatically when the token component 110 is connected to the communication port of the host device 102. In another aspect, when desired, the host device 102 can access and update information (e.g., software, firmware, user data (e.g., when the token component is also a storage device for user data, etc.) stored on the token component 110.

In another aspect, the security component 112 can locate and/or generate a master key file. For instance, if it is the first time that the token component 110 is being used (e.g., with the host device 102), the security component 112 can generate (e.g., automatically generate) a master key file, and the master key file can be stored on the token component 110 and/or host device 102, and the path of the master key file can be stored as well for future use, wherein the security component 110 can retrieve information relating to the path to the stored master key file to locate and retrieve the master key file, when desired. The master key file can be employed to facilitate securely performing processes associated with controlling access to, and controlling data associated with, desired removable storage devices (e.g., 106, 108), when the token component 110 and desired removable storage devices are connected to the host device 102.

The security component 112 can scan (e.g., automatically scan) all or a desired portion of drives (e.g., scan the first drive through the last drive, such as, for example, Drive A: to Drive Z:) connected to the interface component 104 of the host device 102 to obtain (e.g., automatically obtain) a list of empty removable storage devices (e.g., storage devices, such as storage device 106 or storage device 108, if empty), wherein an empty removable storage device (e.g., empty removable drive) can be a removable storage device that contains no files, for example. Empty removable storage devices can comprise separate removable storage devices (e.g., 106, 108) connected to the host device 102 to which the host device's operating system has assigned a distinct drive identifier (e.g., Drive A:, Drive B:, Drive C:, etc.), and/or also can include memory partitions of an empty removable storage device(s) that has its memory partitioned into more than one memory partition that respectively have distinct drive identifiers assigned to them, for example, by the host device's operating system. That is, for instance, a removable storage device having two memory partitions that respectively have been assigned two distinct drive identifiers can be identified as two distinct removable storage devices by the token component 110 with regard to controlling access to those memory partitions (e.g., allowing or denying access to those memory partitions, encrypting and writing data to those memory partitions, reading and decrypting data read from those memory partitions). The security component 112 can manage (e.g., automatically manage) each of the empty removable storage devices one by one, wherein, for each empty removable storage device, the security component 112 can retrieve the master key file and can create (e.g., automatically create) a secure volume file on the removable storage device (e.g., 106, 108). The size of the secure volume file can be equal to the maximum volume size for that removable storage device, or a smaller volume size, when desired. After creating the secure volume file for an empty removable storage device (e.g., 106), the security component 112 can proceed to create a secure volume file for the next empty removable storage device (e.g., 108), and can proceed down through the list of empty removable storage devices until secure volume files have been created for all or a desired portion of the empty removable storage devices on the list of empty removable storage devices.

In still another aspect, the security component 112 can scan (e.g., automatically scan or examine) all or a desired portion of the storage devices connected to the interface component 104 of the host device 102 to obtain (e.g., automatically obtain) a list of removable storage devices that contain a secure volume file, wherein the list of removable storage devices containing a secure volume file can comprise, for example, removable storage devices for which a secure volume file was just created and/or removable drives that already had secure volume files prior to this session. In yet another aspect, the security component 112 can manage (e.g., automatically manage) the removable storage devices (e.g., 106, 108) that contain the secure volume files one by one to mount (e.g., automatically mount) the secure volume file of each, or a desired portion, of the removable storage device until the desired secure volume files on the list have been mounted, wherein the mounting of volume files can be facilitated by the respective master key files associated with the removable storage devices.

In an aspect, the processes of obtaining the list of empty removable storage devices (e.g., connected removable storage devices), creating the secure volume files, obtaining the list of removable storage devices containing secure volume files, mounting the volume files, and/or other processes performed or facilitated by the security component 112 can be performed automatically and/or simultaneously (or at least substantially simultaneously) and transparent to users and without any user intervention being required (e.g., unless the user desires to use an optional password). With the secure volume file mounted for a particular removable storage device (e.g., 106, 108), as desired, data can be written to and stored in the removable storage device by the host device 102 and/or data stored in the removable storage device can be retrieved (or erased) from the removable storage device and provided to the host device 102, wherein data being written to and stored in the removable storage device can be encrypted (e.g., automatically encrypted) and data being retrieved (e.g., read) from the storage device can be decrypted, for example, in accordance with a desired cryptographic algorithm and protocol (e.g., Advanced Encryption Standard (AES)-256 or other desired encryption algorithm). In yet another aspect, while the token component 110 is connected to the host device 102, the security component 112 can be operating to facilitate controlling access to the storage devices (e.g., 106, 108) connected to the host device 102.

If a user desires to dismount one or more mounted volumes respectively associated with one or more removable storage devices (e.g., 106, 108), the desired mounted volumes for dismounting is desired can be selected, and the desired mounted volumes can be dismounted. For example, the user can use a desired interface (e.g., mouse, keyboard, touch screen, etc.) to select a desired mounted volume, wherein a visual representation (e.g., icon) of the desired mounted volume can be displayed on a display screen of the host device 102. A dismount command can be received by the host device 102 from the user (e.g., dragging of the mounted volume icon to an exit or eject area or icon on the display screen; a selected dismount command from a command menu; etc.), and the security component 112 and/or host device 102 can dismount the mounted volume in response to the dismount command. If all of the mounted volumes of the connected removable storage devices (e.g., 106, 108) have been dismounted (e.g., if a dismount-all-volumes-and-exit command is received), the application can be exited or ended by the security component 112 and/or host device 102, as desired.

If and when the token component 110 is disconnected from the host device 102, access to a removable storage device (e.g., 106, 108) that is being secured using the token component 110 (e.g., removable storage device that has data stored thereon which was encrypted using the token component 110) can be denied to the host device 102 or other host devices, and data stored in the removable storage device can be secured from being accessed or retrieved by the host device 102 or other host devices.

In accordance with an example embodiment of the disclosed subject matter, initially, a starting function of the token component 110 can be called. For example, the following starting function of the token component 110 can be called.

int WINAPI WINMAIN (void);

It can be found, for example, in "uCFormat.c".

This function can facilitate setting up an operating environment for the token component 110. It can preserve memory blocks for storing desired (e.g., important or sensitive) variables, such as passwords, master keys, and volume file paths. This function can test the encryption functions and random number generator functions of the security component 112. This function also can attach the token component drivers to the host device 102. Moreover, this function can create the main dialogue box for running the token component 110 by calling a desired dialog-box-creation function, such as, for example, uCDialogBox( ).

Figure 3:
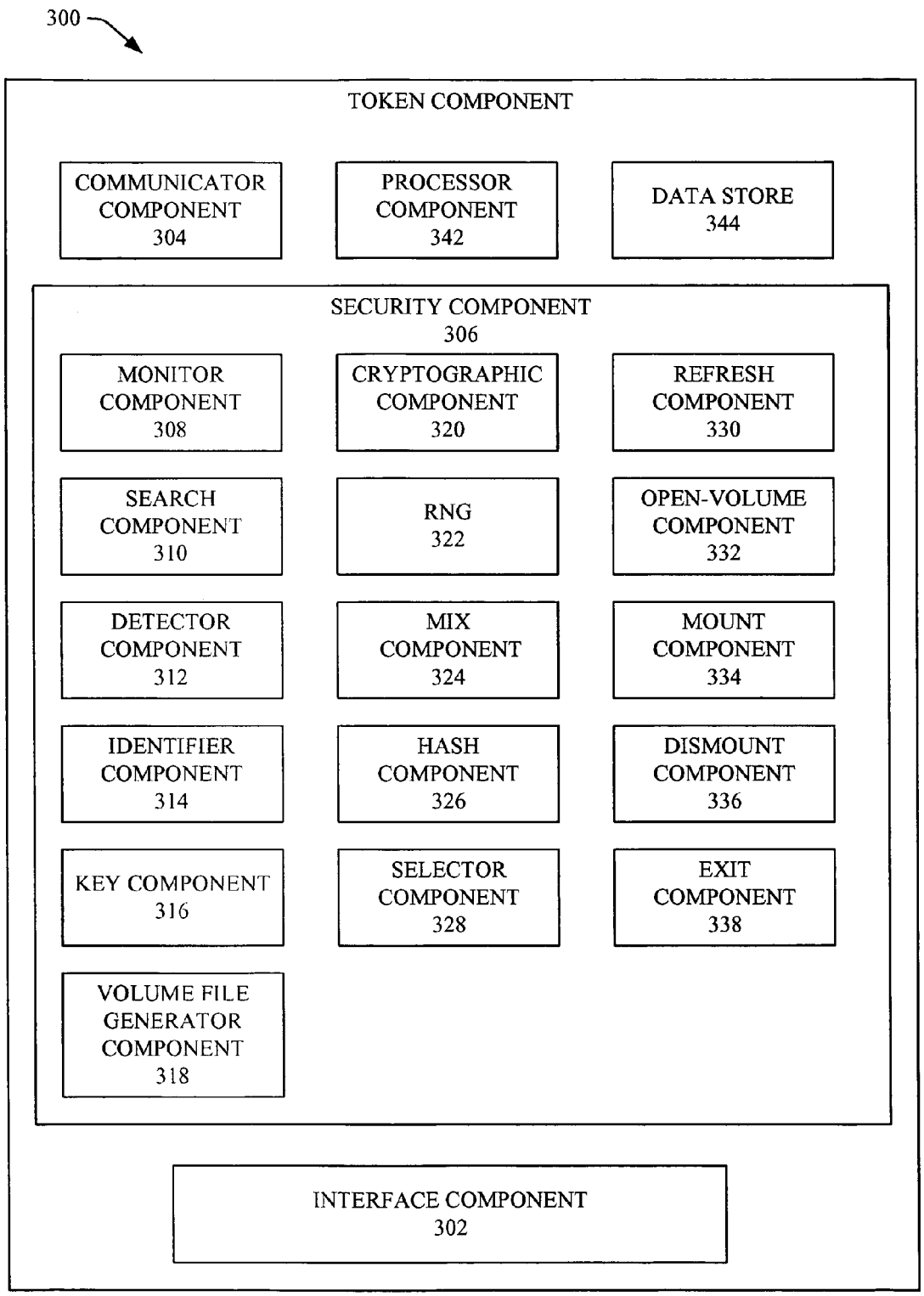
FIG. 3 illustrates a block diagram of an example token component that can control access to and data encryption/decryption associated with removable storage devices associated with a host device in accordance with an embodiment of the disclosed subject matter.

In an aspect, the security component 112 can search removable storage devices (e.g., 106, 108) connected to the host device 102 to determine whether a master key file exists or not. The security component 110 can employ desired code to facilitate determining whether a master key file exists. For instance, the desired code can be located in a desired location, such as the int WINAPI WINMAIN ( ) in "uCFormat.c", in a data store associated with the token component 110. The master key file name can have a desired format, which can include, for example, a prefix of the master key file name, wherein every master key file can have the same prefix of a desired length, and a respective, unique suffix of a desired length. For example, the master key file name format can be as follows: uCrypt-Pass-xxxxxxxxxxxxxxxx, wherein "uCrypt-Pass-" can be the prefix of the master key file name, and) "xxxxxxxxxxxxxxxx" can be the suffix of the master key file name, wherein x is a variable and each x can be a desired (e.g., random) alpha-numeric character. For instance, the suffix can be a 64-bit random number, which can be represented by 16 ASCII characters. This random number can be generated by a random number generator (not shown in FIG. 1; as shown in FIG. 3) of the security component 112. One purpose of this random number can be to prevent volume file duplication.

In another aspect, the security component 112 can search for a file and its file name with the prefix "uCrypt-Pass-" for each of the removable storage devices (e.g., removable drives) connected to the host device 102. For instance, if, for a removable storage device (e.g., 106, 108), the file is found and the file size is greater than 0, then the master key file can be found in the removable storage device and the file path can be stored in a desired location, such as string PassPhrase, and the security component 112 can proceed to obtain a list of empty removable storage devices. However, if the file for a removable storage device is found and the file size is equal to 0, that can mean it is the first time for running the token component 110 for this removable storage device, and the security component 112 can proceed to generate a master key file for that removable storage device. If the security component 112 has searched the detected storage devices and no file with the master key prefix is found, the token component 110 can enter a sleep mode for a predefined period of time (e.g., 1 second, 2 seconds, 3 seconds, . . . ) and can repeat the search process to try to locate or detect a file having the master key prefix. If the security component 112 is unable to locate a file with the master key file prefix after a predefined number of searches (e.g. 1 search, 2 searches, 3 searches, . . . , 6 searches, 7 searches, . . . ) for a given session or over a predefined period of time, the security component 112 can terminate the search and/or can provide a message or indicator to the user, via a display screen on the host device 102, indicating that no file having the master key prefix has been located. One purpose for having the security component 112 perform multiple searches before terminating is because a master key file may not be detected on a first search (or potentially even a second or third search) if the host device 102 or removable storage device(s) is a relatively slower running device.

In an aspect, the security component 112 can employ a desired function to facilitate determining whether the master file exists or not. It can be assumed that there is only the master key file that will be found in the removable storage device. For instance, the following search function can be employed for determinating whether the master key file exists or not.

```
HANDLE WINAPI FindFirstFile(
    __in       LPCTSTR lpFileName,
    __out      LPWIN32_FIND_DATA lpFindFileData
);
```

If the function succeeds, the return value can be a search handle used in a subsequent call to FindNextFile or FindClose, and the lpFindFileData parameter can contain information regarding the first file or directory located. If the function fails or fails to locate files from the search string in the lpFileName parameter, the return value can be INVALID_HANDLE_VALUE and the contents of lpFindFileData are indeterminate. If desired, to obtain extended error information, the security component 112 can call a desired last-error function to identify or obtain the least error, such as the GetLastError function. If the search function fails because no matching files can be found, the desired last-error function can return an error indicating the file was not found, such as, for example, the value ERROR_FILE_NOT_FOUND.

The security component 112 can create a master key file. In an aspect, the security component 112 can employ desired code to create the master key file, wherein the desired code can be located, for example, in a desired location, such as the int WINAPI WINMAIN ( ) in "uCFormat.c", in a data store associated with the token component 110. If the security component 112 located an empty master key file, the security component 112 can generate a new master key file to replace the empty one. For instance, to generate the new master key file, the security component 112 can call a desired random-number-generator function, such as RanGetBytes ( ), in "uCRandom.c" to generate a 512-bit random number as the master key; can call a desired random-number-generator function, such as RanGetBytes ( ), to generate a 64-bit random number as the master key file suffix; can construct the master key file name (prefix+suffix) and store it in a desired location, such as string PassPhrase; can call a desired write function, such as _lwrite ( ), to write the 512-bit master key to the master key file; and can call a desired handler-closing function, such as CloseHandle ( ), to close the master key file handler.

In still another aspect, the security component 112 can form or generate a list of empty removable storage devices (e.g., 106, 108) connected to the host device 102. The security component 112 can examine each storage device connected to the host device 102 to identify whether the storage device is empty and is removable media (as opposed to internal or fixed storage devices). For instance, the security component 112 can employ desired code to determine whether the storage device (e.g., drive) is removable media or not, for instance, by employing a function in the operating system (e.g., Windows) for determining whether a disk drive is a removable, fixed, CD-ROM, RAM disk, or network drive. For instance, the security component 112 can employ a desired function, such as the following function UINT WINAPI GetDriveType (_in_opt LPCTSTR lpRootPathName); wherein if the return value indicates that the storage device is removable (e.g., if the return value is equal to DRIVE_REMOVABLE), the drive can be identified as a removable storage device (e.g., removable media).

If the drive is identified as a removable storage device, the security component 112 can check to determine whether the volume size of the removable storage device is greater than 0 or not. A reason for performing this checking is that some empty communication ports (e.g., USB ports) may present as removable drives with volume size 0 on some host devices 102. Therefore, the security component 112 can check and distinguish between a removable storage device connected to a communication port of the host device 102 and an empty communication port on the host device 102 and can disregard an empty communication port(s). If the storage device is removable media and the volume size is greater than 0, the security component 112 can check to determine whether the removable storage device (e.g., 106, 108) is empty or not. There can be a function in the operating system for retrieving the first file of a disk drive (e.g., storage device). For instance, the following function can be employed:

```
HANDLE WINAPI FindFirstFile(
    __in LPCTSTR lpFileName,
    __out LPWIN32_FIND_DATA lpFindFileData
);
```

If the return value indicates that the removable storage device is empty (e.g., if the return value is equal to INVALID_HANDLE_VALUE), the removable storage device can be identified as empty by the security component 112.

In an aspect, an array, such as array char AvailableList[ ], can store information relating to all the available removable storage devices (e.g., 106, 108) for creating a secure volume file on each of the removable storage device(s), wherein those storage devices can be removable media and empty.

In still another aspect, the security component 112 can manage each of the available empty removable storage devices (e.g., 106, 108) connected to the host device 102 on a one-by-one basis. The security component 112 can be employed to create secure volume files on the empty removable storage devices, for example, using a for-loop that can be used to facilitate retrieving a respective master key file and creating a respective secure volume file for all or a desired portion of the empty removable storage devices on the list of available empty removable storage devices connected to the host device 102.

The security component 112 can retrieve the respective master key from the respective master key file for use in creating a respective secure volume file on a respective empty removable storage device, for each empty removable storage device on the list of empty removable storage devices. The security component 112 can call a desired handler-creation function, such as CreateFile ( ), to create a handler for the master key file associated with the empty removable storage device. If for any reason the security component 112 cannot create the handler for the empty removable storage device, the volume creation process can end. When a handler is created, the security component 112 can call a desired read or copy function, such as _lread ( ), to copy the master key from the master key file to a desired location, such as unsigned char ucryptPassword[81]. The security component 112 can call a desired close-handler function, such as CloseHandle ( ), to close the master key file handler.

In another aspect, the security component 112 can create a secure volume file for the empty removable storage device (e.g., 106, 108). For instance, for creating a secure volume file on an empty removable storage device, a thread can be created by a desired function, such as the following function: static void _cdecl volTransformThreadFunction (void *hwndDlgArg). This thread can call the following file creation function to create a secure volume file for each empty storage device (e.g., empty removable drive): int uCFormatVolume (FORMAT_VOL_PARAMETERS *volParams). The security component 112 can construct a secure volume file name, wherein the volume file prefix can be, for example, "uCrypt-protected-", and the security component 112 can call RanGetBytes ( ) to generate a 64-bit random number as the volume file suffix; call CreateVolumeHeaderInMemory ( ) to create a secure volume header; call CreateFile ( ) to create the secure volume file handler; call a desired set-file-pointer function, such as SetFilePointerEx ( ), and set-end-of-file function, such as SetEndOfFile ( ), to set the size of the secure volume file for the empty storage device, wherein the file size can be equal to the maximum size, or a desired portion, of the empty removable storage device; call a desired set-address-pointer function, such as SetFilePointer ( ), to set the address pointer to the beginning of the volume file and can call a desired write function, such as _lwrite ( ), to write the volume header to the secure volume file; call a desired get-FAT-parameters function, such as GetFatParams ( ), to get the File Allocation Table (FAT) parameters for formatting the secure volume file; call a desired file-system-format function, such as FormatFat ( ), to format the file system of the secure volume file as FAT; and call a desired handler-close function, such as CloseHandle ( ), to close the volume file handler. At this point, the for-loop can be at its end, where if there are other empty removable storage devices on the list of empty removable storage devices for which secure volume files are to be created, the security component 112 can proceed back to the beginning of the for-loop to start creating a secure volume file for the next empty removable storage device on the list; if there are no other empty removable storage, devices for which a secure volume file is to be created, the security component 112 can proceed to the next desired process.

In still another aspect, the security component 112 can form or generate a list of removable storage devices (e.g., 106, 108) that contain a secure volume file and are connected to the host device 102. The security component 112 can examine each storage device (e.g., removable storage device) associated with the host device 102, for instance, by examining (e.g., checking) and determining whether the particular storage device is a removable drive and whether it has a secure volume file. To facilitate generating the list of removable storage devices that contain a secure volume file, the security component 112 can employ desired code, for example, GetDriveType ( ) to check whether the particular storage device is removable media or not, and if the return value indicates that the drive is removable (e.g., if the return value is equal to DRIVE_REMOVABLE), the storage device (e.g., 106, 108) can be identified as removable media by the security component 112; if the storage device is identified as removable media, the security component 112 can examine and determine whether the volume size of the removable storage device is greater than 0 or not, wherein one reason for performing such check is that some empty communication ports (e.g. USB ports) may present as removable drives with volume size 0 on some machines, and therefore, it is desirable for the security component 112 to identify and bypass the empty communication ports; if the storage device is a removable media and the volume size is greater than 0, the security component 112 can determine that there is a removable storage device connected to that communication port of the host device 102, and can examine and determine whether there exists a secure volume file for the removable storage device, for example, by using a file-finder function, such as FindFirstFile ( ); and the security component 112 can create a desired array, such as an array char MountVolList [ ], that can store information (e.g., name or other identifier) of all the removable storage devices that contain a respective secure volume file.

In yet another aspect, the security component 112 can manage the removable storage devices on a one-by-one basis to mount the respective secure volume files of the removable storage devices as real disks in relation to the host device 102. To facilitate mounting the secure volume files as real disks on the host device 102, the security component 112 can employ a desired for-loop, wherein, at the beginning of the for-loop, the security component 112 can retrieve a respective master key associated with the particular removable storage device for which the secure volume file is to be mounted, wherein, for example, retrieving the master key can be facilitated as follows: calling a desired create-file function or create-handler function (e.g., CreateFile ( )) to create a handler for the master key file associated with the removable storage device (wherein, if for any reason the security component 112 cannot create the handler for the removable storage device, the mounting process can end); when a handler is created, calling a desired read or copy function, such as _lread ( ), to copy the master key from the master key file to a desired location, such as unsigned char ucryptPassword[81], and calling a desired handler-close function, such as CloseHandle ( ), to close the master key file handler.

After retrieving the master key associated with the particular removable storage device, the security component 112 can mount the secure volume file of the removable storage device as a real disk on the host device 102. The security component 112 can employ desired mounting code to facilitate mounting the secure volume file, wherein the desired mounting code, for example, GetFirstAvailableDrive ( ) to obtain an unused drive letter that can be used for mounting the secure volume file as a real disk; call the following function to mount a secure volume file as a real disk

```
int MountVolume (
    HWND hwndDlg,
    int driveNo,
    char *volumePath,
    EncKey *enckey,
    MountOptions *mountOptions,
);
``` wherein, if the return value is −1, this can mean the user aborted the function, if the return value is 0, this can mean that the mounting function failed, and, if the return value is greater than 0, this can mean the secure volume file is mounted successfully; and can maintain information of the respective mounted volumes of the respective removable storage devices, wherein, for example, two arrays can be used for maintaining the information of the respective mounted volumes, wherein the two arrays can be, for example, AutoMountedSource[ ]//Storing the source path of the mounted volumes and AutoDriveNoList[ ]//Storing the drive letters which used for mounting a volume. These arrays can facilitate preventing double mounting of a volume and support the taskbar icon functions.

At this point, the for-loop for mounting volumes as real disks on the host device 102 can be at an end point, where if there are other removable storage devices for which secure volume files are to be mounted, the security component 112 can proceed back to the beginning of the for-loop for mounting volumes to start mounting a secure volume file for the next removable storage device on the list of removable storage device containing a secure volume file; if there are no other removable storage devices for which a secure volume file is to be mounted (e.g., no other devices on the list of removable storage devices containing a secure volume file), the security component 112 can end the for-loop for mounting volumes, and can proceed to the next desired process.

In still another aspect, while the token component 110 is connected to the host device 102 and operating, the security component 112 can monitor operations associated with the mounted volumes and manage desired taskbar icon functions, including, for example, refresh functions, functions relating to opening a mounted volume, functions relating to dismounting a mounted volume, functions relating to dismounting all mounted volumes and exiting, and/or other desired functions, such as more fully disclosed herein. For instance, the security component 112 can employ a desired function, such as the MainDialogProc ( ), to facilitate responding to messages, such as WM_INITDIALOG and WM_ENDSESSION messages, wherein there can be a function in the security component 112 to facilitate monitoring operations associated with the mounted volumes and manage desired taskbar icon functions. The security component 112 can employ desired code to facilitate managing desired taskbar icon functions, wherein the desired code can be located, for example, in a desired location, such as the BOOL CALLBACK MainDialogProc ( ), in "uCFormat.c", in the token component 110.

In an aspect, the security component 112 can manage and facilitate execution of a refresh function, for example, in response to receiving a refresh command from a user via the taskbar menu displayed on the display screen of the host device 102 (e.g., in response to the user clicking the "refresh" button in the taskbar menu). In response to the refresh request, the security component 112 can scan the communication ports on the host device 102 for a new removable storage device(s) (e.g., new plug-in removable storage device(s)) that have been connected to the host device 102, create a new secure volume file on a new removable storage device(s) and/or mount the secure volume file of a new removable storage device(s), in a manner such as more fully disclosed herein.

In still another aspect, the security component 112 can monitor, examine, and detect whether the user selects to open a mounted volume of a removable storage device. If the security component 112 detects that the user has selected to open a mounted volume (e.g., by clicking "open" or "open volume" in the taskbar menu displayed on the host device 102), the security component 112 can open the desired mounted volume which was selected by the user. To facilitate opening the desired mounted volume, the security component 112 can employ desired code, for example, OpenVolumeExplorerWindow ( ) to open a windows explorer of the selected mounted volume.

In yet another aspect, the security component 112 can monitor, examine, and detect whether the user selects to dismount a mounted volume of a removable storage device (e.g., detect whether the user has selected "dismount" or "dismount volume" in the taskbar menu displayed on the host device 102). In response to detecting that the user has selected a dismount command to dismount a mounted volume, the security component 112 can dismount a mounted volume which was selected to be dismounted by the user. The security component 112 can employ desired dismount volume code that can be located, for example, in the BOOL CALLBACK MainDialogProc ( ) in "uCFormat.c", in a data store associated with the token component 110. Employing the desired dismount volume code, the security component 112 can set the Dismounting flag to a defined dismounting value (e.g., TRUE). If the Dismounting flag is set to the defined dismounting value (e.g., TRUE), the taskbar menu will not be displayed until the dismount volume process is complete and the Dismounting flag is set to a defined dismount-complete value (e.g., FALSE) by the security component 112. This can prevent duplicate dismounting of the same mounted volume, which can cause an error. The security component 112 also can call UnmountVolume ( ) to dismount the desired mounted volume. The security component 112 can call a desired update-drive-information function, such as UpdateDriveNoList ( ), to update the information regarding the mounted volumes, wherein, for example, the list of mounted volumes can be updated to remove the volume that was dismounted.

In another aspect, when desired, the user can select to dismount all mounted volumes associated with the host device 102 and exit from the token component 110. The security component 112 can monitor, check, and detect whether the user selects to dismount all mounted volumes of removable storage devices and exit the token component 110 (e.g., detect whether the user has selected "dismount all and exit" in the taskbar menu displayed on the host device 102). If the security component 112 does not detect that a command to dismount all mounted volumes and exit has been selected, the security component 112 can continue to monitor to detect whether any taskbar icon functions have been selected and manage performing desired taskbar icon functions. If the security component 112 detects that a command to dismount all mounted volumes and exit has been selected, the security component 112 can dismount all the mounted volumes and exit the program executed by the security component 112, wherein desired dismount/exit code, for example, UnmountVolume ( ) can be invoked to dismount all mounted volumes one by one; call a desired taskbar function, such as TaskBarIconRemove ( ), to remove the taskbar icon and taskbar menu; and call a desired exit function, such as EndMainDlg ( ), to exit the program.

In an aspect, a secure volume file can be a normal file, which can be created on any desired removable storage device (e.g., 106, 108). In accordance with an embodiment, a secure volume file can be created in accordance with the following example Secure Volume Format Specification (shown in Table 1):

TABLE 1

| Size (bytes) | Encryption Status | Description |
| --- | --- | --- |
| 64 | Unencrypted | Salt |
| 4 | Encrypted | CRC-32 checksum of the (decrypted) bytes 256-511 |
| 8 | Encrypted | Size of volume |
| 8 | Encrypted | Size of the encrypted area within the master key scope |
| 4 | Encrypted | CRC-32 checksum of the (decrypted) bytes 64-251 |
| Var. | Encrypted | Concatenated master keys** |
| Var. | Encrypted | Data area (131072 to the end of the volume file). | wherein (**) can signify that multiple concatenated master keys can be stored in that portion of the file when the volume is encrypted using a cascade of ciphers (e.g., secondary master keys are used for XTS mode (XEX-based Tweaked CodeBook mode (TCB) with CipherText Stealing (CTS))). It is noted that bytes 0 through 131072 of a secure volume file can be the secure volume header.

Figure 2:
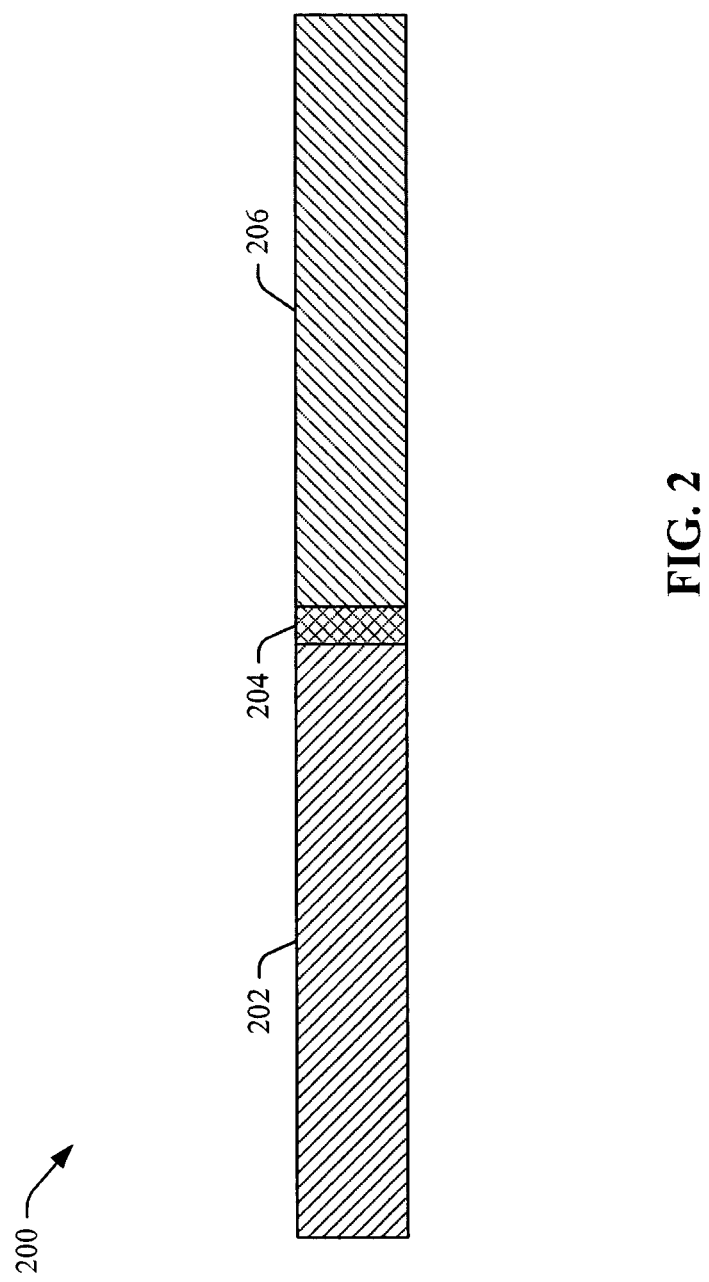
FIG. 2 a diagram of an example master key file in accordance with an embodiment of the disclosed subject matter.

Referring briefly to FIG. 2 (along with FIG. 1), FIG. 2 depicts a diagram of an example master key file 200 in accordance with an embodiment of the disclosed subject matter. In an aspect, a master key file can be a normal file, which can be created and stored on the token component 110. In an embodiment, the master key file can be created in accordance with the following example Master Key File Format Specification:

TABLE 2

| Size (bytes) | Encryption Status | Description |
| --- | --- | --- |
| 64 | Encrypted/ Unencrypted | secure (or uCrypt) master key |
| 4 | Encrypted | ASCII string "TRUE". |
| 64 | Unencrypted | Salt |

As depicted in FIG. 2 and Table 2, there can be a desired number of bytes (e.g., 64 bytes) that can be used for the passphrase (202), a specified number of bytes (e.g., 4 bytes) that can be used for the ASCII string "TRUE" (204), a desired number of bytes that can be set to 0 (e.g., 12 bytes) (206), a desired number of bytes (e.g., 1 byte) that can be used for a flag (208), and a desired number of bytes (e.g., 64 bytes) that can be used for salt (210).

In yet another aspect, a user can have an option to protect the master key stored in the master key file. For instance, a user can set a desired password to encrypt the master key. The code of this password option can be located, for example, in the BOOL CALLBACK MainDialogProc ( ) in "uCFormat.c" in a data store in the token component 110. If the user does not set a password to protect the master key, the master key file can include a specified number of bytes (e.g., the first 81 bytes). A desired subset of bytes (e.g., the first 64 bytes) (202) of the specified number of bytes can be the master key without encryption. If the user does set a password to protect the master key, the master key file can include a larger number of bytes (e.g., 145 bytes) than the specified number of bytes employed when no password is set. A desired number of bytes (e.g., the first 64 bytes) (202) can be the encrypted master key; an ASCII string having a desired word or value, such as "TRUE", which can include a small number of bytes (e.g., 4 bytes) (204), also can be encrypted, wherein the desired word (e.g., "TRUE") can be used for decryption validation; and a desired number of bytes (e.g., the last 64 bytes) (206) at the end of the larger set of bytes can be the salt used for master key decryption, wherein the salt can be, for example, randomly generated data values that can be used as one of a desired number of inputs to a key derivation function and/or used as a part of a key in a cipher or other cryptographic algorithm; and a desired number of bytes (e.g., 12 bytes) between the word "TRUE" and the Flag can be set to a desired data value (e.g., 0).

As stated, the security component 112 can encrypt data being stored on, or decrypt data being retrieved or read from, a removable storage device (e.g., 106, 108) secured or controlled by the token component 110. In an embodiment, the security component 112 can employ desired cryptographic algorithms and protocols. For example, the security component 112 can employ an AES-256 algorithm to encrypt and decrypt data. For example, the security component 112 can use AES with 14 rounds and a 256-bit key (e.g., AES-256) operating in XTS mode. In another aspect, the security component 112 can use a desired hash algorithm, such as SHA-512. When employing the SHA-512 algorithm, the size of the output of this hashing algorithm can be 512 bits.

As stated, a mode of operation used by the security component 112 for encrypted partitions, drives, and virtual volumes can be XTS mode. XTS mode is a form of XEX mode, with a modification (e.g., XEX mode uses a single key for two different purposes, whereas XTS mode uses two independent keys). XTS mode was approved as the IEEE 1619 standard for cryptographic protection of data on block-oriented storage devices. For example, the XTS mode can be described as follows: $C_i = E_{K1} \ (P_i \hat{} (E_{K2}(n) \otimes \alpha^i))\hat{} \ (E_{K2}(n) \otimes \alpha^i)$, wherein $\otimes$ denotes multiplication of two polynomials over the binary field GF(2) modulo $x128+x7+x2+x+1$, K1 is the encryption key (256-bit for each supported cipher; e.g., AES), K2 is the secondary key (256-bit for each supported cipher; e.g., AES), i is the cipher block index within a data unit; for the first cipher block within a data unit, i=0, n is the data unit index within the scope of K1; for the first data unit, n=0, and α is a primitive element of Galois Field (2128) that corresponds to polynomial x (e.g., 2). The size of each data unit can always be 512 bytes (regardless of the sector size).

In yet another aspect, a header key can be used to encrypt and decrypt the encrypted area of the secure volume header, which can contain the master key and other desired data (e.g., see the Secure Volume Format Specification). In volumes created by the token component 110, the area can be encrypted in XTS mode. The method that the token component 110 (e.g., security component 112 therein) uses to generate the header key and the secondary header key (XTS mode) can be, for example, Password-Based Key Derivation Function 2 (PBKDF2), as specified in Public-Key Cryptography Standards (PKCS) #5 v2.0.

In an embodiment, a salt can be used having a predefined number of bits (e.g., 512 bits). For example, if a 512-bit salt is used, there can be 2512 keys for each password. This can decrease vulnerability to "off-line" dictionary attacks, as pre-computing all the keys for a dictionary of passwords can be very difficult when a salt is used. The salt can comprise random values generated by the random number generator of the security component 112 during the volume creation process employed for a desired removable storage device (e.g., 106, 108). The header key derivation function can be based at least in part on Hash-based Message Authentication Code (HMAC)-Secure Hash Algorithm (SHA)-512 (HMAC-SHA-512). The length of the derived key can be a desired number of bits long (e.g., 256 bits long). Many iterations (e.g., 1000 iterations) of the key derivation function have to be performed to derive a header key, which can increase the time necessary to perform an exhaustive search for passwords (e.g., as part of brute force attack), and the many iterations can facilitate decreasing the risk of an attack, such as a brute force attack.

Header keys used by ciphers in a cascade can be mutually independent, even though they are derived from a single password. Hence, even when an attacker has one of the keys, the attacker cannot use it to derive the other keys, as typically it is not feasible to determine the password from which the key was derived (except potentially for a brute force attack mounted on a weak password).

As stated, the security component 112 can employ a random number generator (RNG) that can be used to generate random numbers, which can be used to generate, for example, the master encryption key, the secondary key (XTS mode), salt, and/or keyfiles. For instance, the random number generator can create a pool of random values that can be stored in memory (e.g., RAM). The pool, which can be a desired number of bytes long (e.g., 640 bytes long), can be filled with data from one or more of the following sources: mouse movements, keystrokes, values generated by a built-in RNG (e.g., /dev/random and /dev/urandom) in the host device 102 (e.g., Macintosh or Linux computers), CryptoAPI (which can be collected regularly at 500-ms intervals) of a host device 102 (e.g., for Windows-based computers), network interface statistics (e.g., NETAPI32) (e.g., for Windows-based computers), and/or various Win32 handles, time variables, and/or counters (e.g., collected regularly at 500-ms intervals) (e.g., for Windows-based computers).

In an aspect, before a value obtained from any of the above-mentioned sources is written to the pool of random numbers, it can be divided into individual bytes (e.g., a 32-bit number can be divided into 4 bytes). These bytes can be individually written to the pool with, for example, a modulo 28 addition operation (not by replacing the old values in the pool) at the position of the pool cursor. After a byte is written, the pool cursor position can be advanced by one byte. When the cursor reaches the end of the pool, its position can be set to the beginning of the pool. In an embodiment, after every predefined number of bytes (e.g., 16 bytes) is written to the pool, the pool mixing function can be applied to the entire pool, such as more fully disclosed herein.

With regard to the pool mixing function, one purpose of this function is to perform diffusion. Diffusion can spread the influence of individual "raw" input bits over as much of the pool state as possible or desirable, which also can hide statistical relationships to reduce risk of discovery of the numbers. After every predefined number of bytes (e.g., 16 bytes) is written to the pool, this function can be applied to the entire pool. For example, the security component 112 can employ the pool mixing function as follows:

1. Let R be the randomness pool
2. Let H be the hash function selected by the user (e.g., SHA-512, RIPEMD-160, or Whirlpool)
3. l=byte size of the output of the hash function H (e.g., if H is RIPEMD-160, then l=20; if H is SHA-512, l=64)
4. z=byte size of the randomness pool R (e.g., 640 bytes)
5. q=z/l−1 (e.g., if H is Whirlpool, then q=4)
6. R is divided into l-byte blocks B0 . . . Bq.
  For 0 ≤ i ≤ q (e.g., for each block B) the following acts can be performed:
   a. M=H (B0∥B1∥ . . . Bq) [e.g., the randomness pool is hashed using the hash function H, which produces a hash M]
   b. Bi=Bi^ M
7. R=B0∥B1∥ . . . ∥Bq For example, if q=1, the randomness pool can be mixed as follows:
 1. (B0∥B1)=R
 2. B0=B0^H(B0∥B1)
 3. B1=B1^H(B0∥B1)
 4. R=B0∥B1

It is to be appreciated and understood, that while system 100 is shown with two storage devices (e.g., 106, 108), the various embodiments described herein are not so limited as there can be any desired number of storage devices (e.g., less than two storage devices, two storage devices, more than two storage devices). It is to be appreciated and understood that the system 100 is disclosed as comprising the components specified herein, however, the subject specification is not so limited, as the system 100 can include other components, which have not been shown here for reasons of brevity and clarity.

FIG. 3 depicts a block diagram of an example token component 300 that can control access to and data encryption/decryption associated with removable storage devices associated with a host device in accordance with an embodiment of the disclosed subject matter. In an aspect, the token component 300 can comprise an interface component 302 that can contain one or more desired types of communication interfaces, such as a USB interface (e.g., USB connector) or IEEE 1394 interface (e.g., IEEE 1394 connector) that can be used to connect to a desired device, such as a host device, to facilitate enabling the token component 300 to perform desired functions (e.g., access control, data encryption/decryption), such as more fully disclosed herein.

The token component 300 also can include a communicator component 304 that can be employed to facilitate transmitting or receiving information from another device (e.g., host device) with which the token component 300 is interfaced. The communicator component 304 can employ desired algorithms or protocols to facilitate communication of data between the token component 300 and other devices.

In an aspect, the token component 300 can include a security component 306 that can be utilized to control access to, and encryption/decryption of data associated with, desired removable storage devices associated with a host device with which the token component 300 is associated. The security component 306 can contain a monitor component 308 that can monitor or examine conditions associated with the token component 300, associated host device, and/or associated storage devices to facilitate identifying or determining whether a command relating to a function of the token component 300 has been received, and/or monitor other desired functions or components.

The security component 306 also can comprise a search component 310 that can perform desired searches, such as search for (and retrieve) a file (e.g., master key file) and/or file name, search for empty removable storage devices connected to a host device with which the token component 300 is connected, search for removable storage devices that contain a secure volume file, and/or other desired searches. The security component 306 also can include a detector component 312 that can detect whether a master key file exists with respect to a removable storage device, detect whether a storage device is connected to the host device and whether the drive is a removable storage device or not.

In an aspect, the security component 306 can comprise an identifier component 314 that can identify removable storage device or assign drive names to removable storage devices (e.g., drive A:, drive B:, drive C:, . . . ) to facilitate distinguishing between different removable storage devices connected to the host device. The security component 306 also can include a key component 316 that can generate a desired key, such as a master key, and/or associated file (e.g., master key file), for example, when no master key exists on the removable storage device(s) or when a new master key and master key file is desired to replace an empty master key file. In an aspect, the security component 306 also can employ a volume file generator component 318 that can generate one or more desired secure volume files respectively associated with one or more removable storage devices associated with a host device with which the token component 300 is associated.

The security component 306 also can comprise a cryptographic component 320 that can employ desired cryptographic algorithms and protocols to encrypt and decrypt data being stored on or retrieved from removable storage devices connected to the host device and/or other desired information (e.g., master key). For example, the cryptographic component 320 can employ an AES-256 encryption algorithm to encrypt or decrypt data. The security component 306 can include an RNG component 322 that can be employed to generate random numbers that can be used to encrypt or decrypt data, create the suffixes of master key file names, the master key, a secondary key (e.g., for XTS mode), salt, keyfiles, etc. As desired, the random numbers can be placed (e.g., stored) in a pool of random numbers. The security component 306 also can include a mix component 324 that can be employed to mix the pool of random numbers when predefined mix conditions have been met (e.g., mix the pool after every $16^{th}$ byte is written to the pool). The mix component 324 also can control other operations (e.g., movement of the position of the pool cursor) associated with mixing the pool of random numbers. The security component 306 also can employ a hash component 326 that can employ a desired hash algorithm to hash desired data and generate a desired hash value. For example, the hash component 326 can employ an SHA-512 hash algorithm to hash data.

In another aspect, the security component 306 can comprise a selector component 328 that can receive, detect, and/or identify selections of functions associated with the token component 300. For instance, the selector component 328 can receive selections of functions, such as refresh, mount volume, dismount volume, dismount all volumes and exit, or other functions, as provided in a taskbar menu and selected by a user who can manipulate (e.g., click on) a desired icon in the taskbar menu representative of the function desired by the user.

In still another aspect, the security component 306 can contain a refresh component 330 that can be employed to perform a refresh function that can facilitate recognizing, creating new secure volume files, and mounting of the new secure volume files for removable storage devices that are newly connected to the host device. The security component 306 can include an open-volume component 332 that can be employed to facilitate opening a desired mounted volume associated with a desired removable storage device, for example, when a user selects an open-volume icon in the taskbar menu.

In an aspect, the security component 306 can include a mount component 334 that can be employed to mount one or more secured volume files respectively associated with one or more removable storage devices, which are connected to the host device, as real disks on the host device, as more fully disclosed herein.

The security component 306 can comprise a dismount component 336 that can perform a dismount function to dismount a desired mounted volume associated with a desired removable storage device. The dismounting of a mounted volume can be performed, for example, in response to a user selecting the dismount icon in the taskbar menu in relation to the mounted volume for which dismounting is desired. In another aspect, the dismount component 336 also can be used to dismount all mounted volumes associated with all removable storage devices connected to the host device. For example, this can be performed in response to a user selecting the dismount-all-and-exit function in the taskbar menu. The security component 306 can comprise an exit component 338 that can be employed to exit the process or program being executed by the token component 300, for instance, after all the mounted volumes are dismounted. This can be performed in response to a user selecting the dismount-all-and-exit function in the taskbar menu, for example.

In yet another aspect, the security component 306 can contain an authenticator component 340 that can be used to facilitate authenticating a user who is attempting to use the token component 300, for example, to access (e.g., access data stored on) a removable storage device, which is secured by the token component 300 and connected to a host device. The user optionally can create authentication credentials, such as a password or passphrase, that can be stored by the token component 300. If the user has created authentication credentials, when the user desires to use the token component 300, the user can enter the authentication credentials into the host device or directly into the token component 300 (e.g., when the token component includes an interface for receiving input directly) and the authenticator component 340 can retrieve the stored authentication credentials and can compare it to the received authentication credentials, and if there is a match, the authenticator component 340 can grant the user certain rights to access and use the token component 300, but if there is no match, the authenticator component 340 can deny access to the token component 300 to the user and/or can request that the user re-enter the authentication credentials again up to a predefined maximum number of access attempts. If the user unsuccessfully attempts to enter valid authentication credentials the maximum number of times, the token component 300 can lock the user (and others) out from further access attempts for at least a predefined amount of time or until a reset is performed (e.g., re-start the host device with the token component 300 connected to the host device, or other desired tasks, to reset the token component 300).

The token component 300 also can include a processor component 342 that can work in conjunction with the other components (e.g., interface component 302, communicator component 304, security component 306, etc.) to facilitate performing the various functions of the token component 300. The processor component 342 can employ one or more processors, microprocessors, or controllers that can process data, such as information relating to controlling access to a removable storage device secured by the token component 300, information relating to encrypting or decrypting data, information relating to operations of the token component 300, and/or other information, etc., to facilitate operation of the token component 300, as more fully disclosed herein, and control data flow between the token component 300 and other components (e.g., host device, removable storage devices, etc.) associated with the token component 300.

The token component 300 can include a data store 344 that can that can store data structures (e.g., user data (e.g., when the token component 300 is itself also a removable storage device), metadata); code structure(s) (e.g., modules, objects, hashes, classes, procedures) or instructions; information relating to cryptographic algorithms and protocols, information relating to encrypting and decrypting data, information relating to removable storage devices, information relating to operations of the token component 300, information relating to authentication, authentication credentials, etc., to facilitate controlling operations associated with the token component 300, etc. In an aspect, the processor component 342 can be functionally coupled (e.g., through a memory bus) to the data store 344 in order to store and retrieve information desired to operate and/or confer functionality, at least in part, to the interface component 302, communicator component 304, security component 306, and/or substantially any other operational aspects of the token component 300. It is to be appreciated and understood that the token component 300 is disclosed as comprising the components specified herein, however, the subject specification is not so limited, as the token component 300 can include other components, which have not been shown here for reasons of brevity and clarity.

Figure 4:
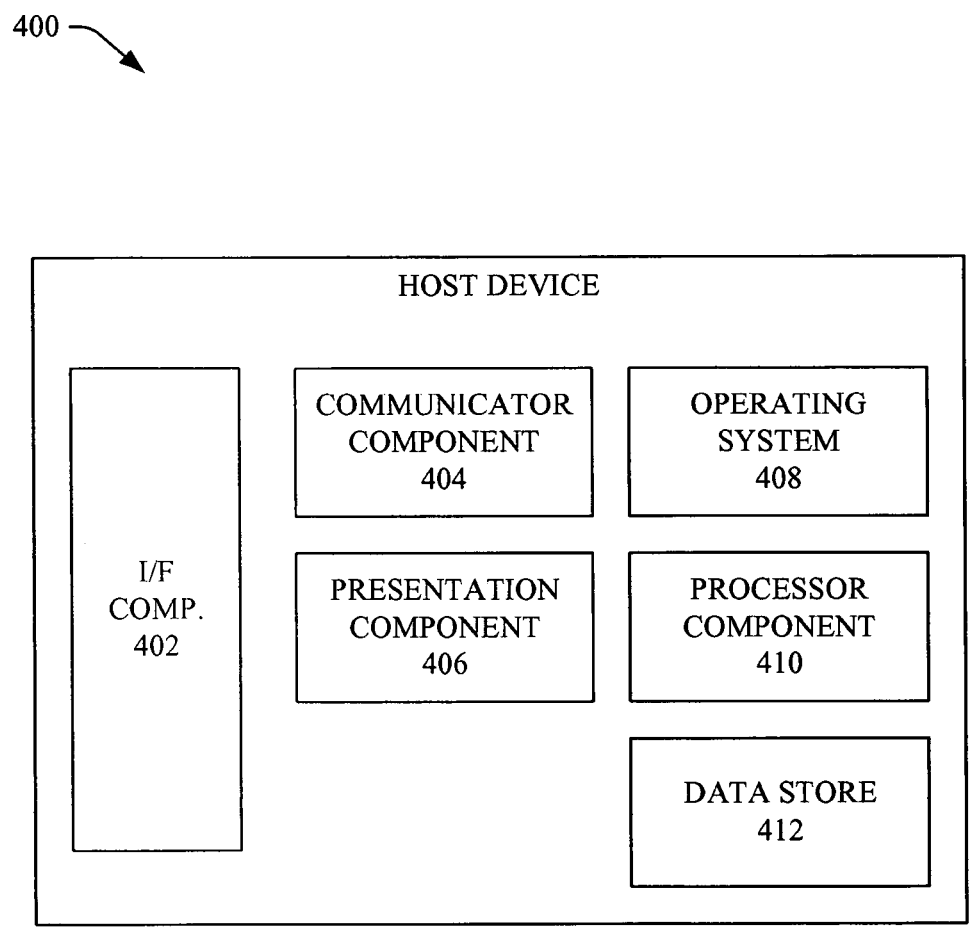
FIG. 4 depicts a block diagram an example host device in accordance with an embodiment of the disclosed subject matter.

FIG. 4 illustrates a block diagram of an example host device 400 in accordance with an embodiment of the disclosed subject matter. The host device 400 can include an interface component 402 that can comprise one or more desired types of communication interfaces, such as, for example, a USB interface(s) or communication port(s) (e.g., USB connector(s)) or IEEE 1394 interface(s) or communication port(s) (e.g., IEEE 1394 connector(s)), that can be used to connect to one or more desired devices, such as a token component, removable storage devices, or other peripheral devices, to facilitate using the desired device(s) to perform desired functions associated with the desired device(s), such as more fully disclosed herein. The interface component 402 also can include a wireless interface(s) that can be used to wirelessly connect the host device 400 with removable storage devices and/or other peripheral devices using a desired wireless technology (e.g., Wi-Fi, Wi-Max, Bluetooth, cellular, etc.).

The host device 400 also can comprise a communicator component 404 that can be employed to facilitate transmitting or receiving information from another device (e.g., token component, removable storage device, peripheral devices, etc.) with which the host component 400 is interfaced. The communicator component 404 can employ desired algorithms or protocols to facilitate communication of data between the host device 400 and other devices with which the host device 400 is communicatively connected.

The host device 400 can include a presentation component 406 that can present data associated with the processor 410. It is to be appreciated that the presentation component 406 can be incorporated into the processor component 410 and/or can be a stand-alone component (as depicted). The presentation component 406 can provide various types of user interfaces to facilitate interaction between a user and any component coupled to the processor component 410.

For instance, the presentation component 406 can provide one or more graphical user interfaces (GUIs), command line interfaces, and the like. For example, a GUI (e.g., touch screen GUI) can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 410.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or an application programming interface (API). In addition, the command line interface can be employed in connection with hardware (e.g., video cards) and/or displays (e.g., black and white, and enhanced graphics adaptor (EGA), etc.) with limited graphic support, and/or low bandwidth communication channels.

In another aspect, the host device 400 can contain an operating system 408 that can be executed on the host device 400, and can manage the host-device hardware and provide common services for efficient execution of various application software used by the host device 400 and/or other devices (e.g., token component, removable storage device, other peripheral device) connected to the host device 400.

In still another aspect, the host device 400 can contain a processor component 410 that can work in conjunction with the other components (e.g., interface component 402, communicator component 404, presentation component 406, operating system 408, etc.) to facilitate performing the various functions of the host device 400. The processor component 410 can employ one or more processors, microprocessors, or controllers that can process data, such as information relating to interfacing with devices connected to the host device 400, received information, presentation of information, operating system information, application information, information relating to encrypting or decrypting data, information relating to operations of the host device 400, and/or other information, etc., to facilitate operation of the host device 400, as more fully disclosed herein, and control data flow between the host device 400 and other components (e.g., token component, removable storage devices, other peripheral devices, etc.) associated with the host component 400.

The host device 400 can include a data store 412 that can that can store data structures (e.g., user data, metadata); code structure(s) (e.g., modules, objects, hashes, classes, procedures) or instructions; information relating to interfacing with devices connected to the host device 400, received information, presentation of information, operating system information, application information, information relating to cryptographic algorithms and protocols, information relating to encrypting and decrypting data, information relating to an associated token component, information relating to removable storage devices, information relating to operations of the host device 400, information relating to authentication, passwords or passphrases, etc., to facilitate controlling operations associated with the host device 400, etc. In an aspect, the processor component 410 can be functionally coupled (e.g., through a memory bus) to the data store 412 in order to store and retrieve information desired to operate and/or confer functionality, at least in part, to the interface component 402, communicator component 404, presentation component 406, operating system 408, and/or substantially any other operational aspects of the host device 400. It is to be appreciated and understood that the host device 400 is depicted as comprising interface component 402, communicator component 404, presentation component 406, operating system 408, however, the subject specification is not so limited, as the host device 400 can include other components, which have not been shown here for reasons of brevity and clarity.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-11 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Figure 5:
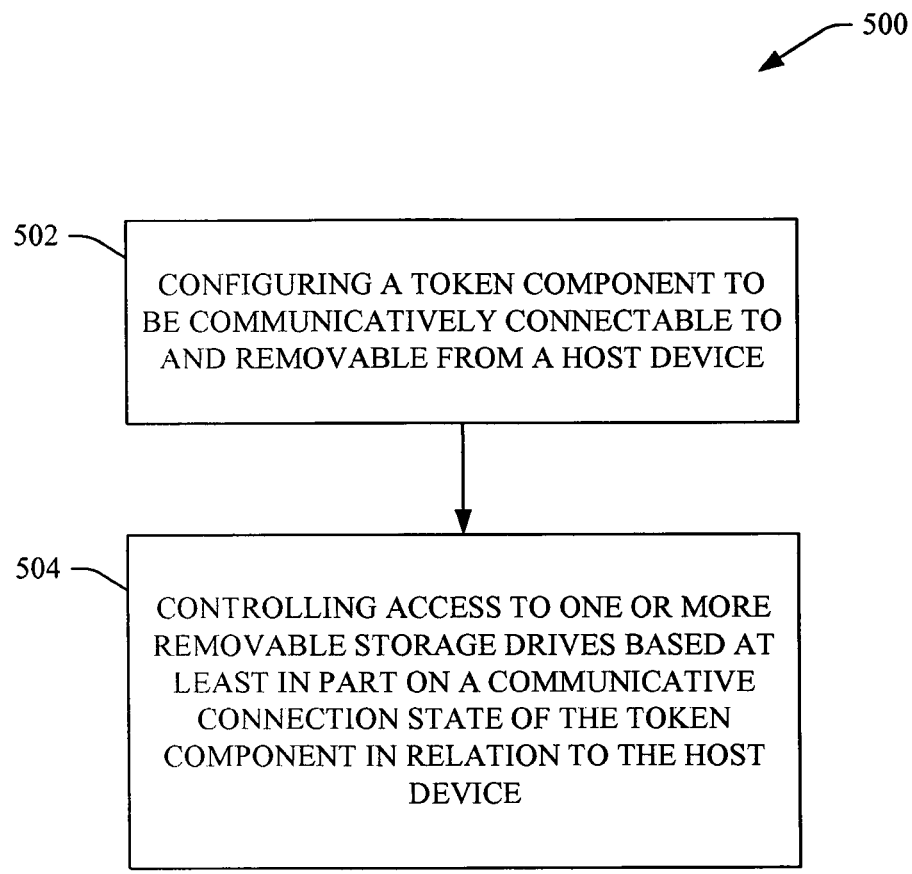
FIG. 5 illustrates a flow diagram of an example method that can control access to, and encryption/decryption of data associated with, removable storage device(s) in accordance with various embodiments and aspects of the disclosed subject matter is illustrated.

Referring to FIG. 5, an example method 500 that can control access to, and encryption/decryption of data associated with, removable storage device(s) in accordance with various embodiments and aspects of the disclosed subject matter is illustrated. At 502, a token component can be configured to be communicatively connectable to and removable from a host device. At 504, access to one or more removable storage drives (e.g., removable storage devices) can be controlled based at least in part on a communicative connection state of the token component in relation to the host device. The token component can control access to one or more removable storage drives that are being secured using the token component. The token component also can facilitate encrypting data written to, and decrypting data being read from, the one or more removable storage drives. The one or more removable storage drives cannot be accessed by a host device unless the token component is connected to the host device (e.g., unless the token component is in a connected state in relation to the host device). Access to the one or more removable storage drives connected to the host device can be denied when the token component is not connected to the host device (e.g., when the token component is in an unconnected state in relation to the host device).

Figure 6:
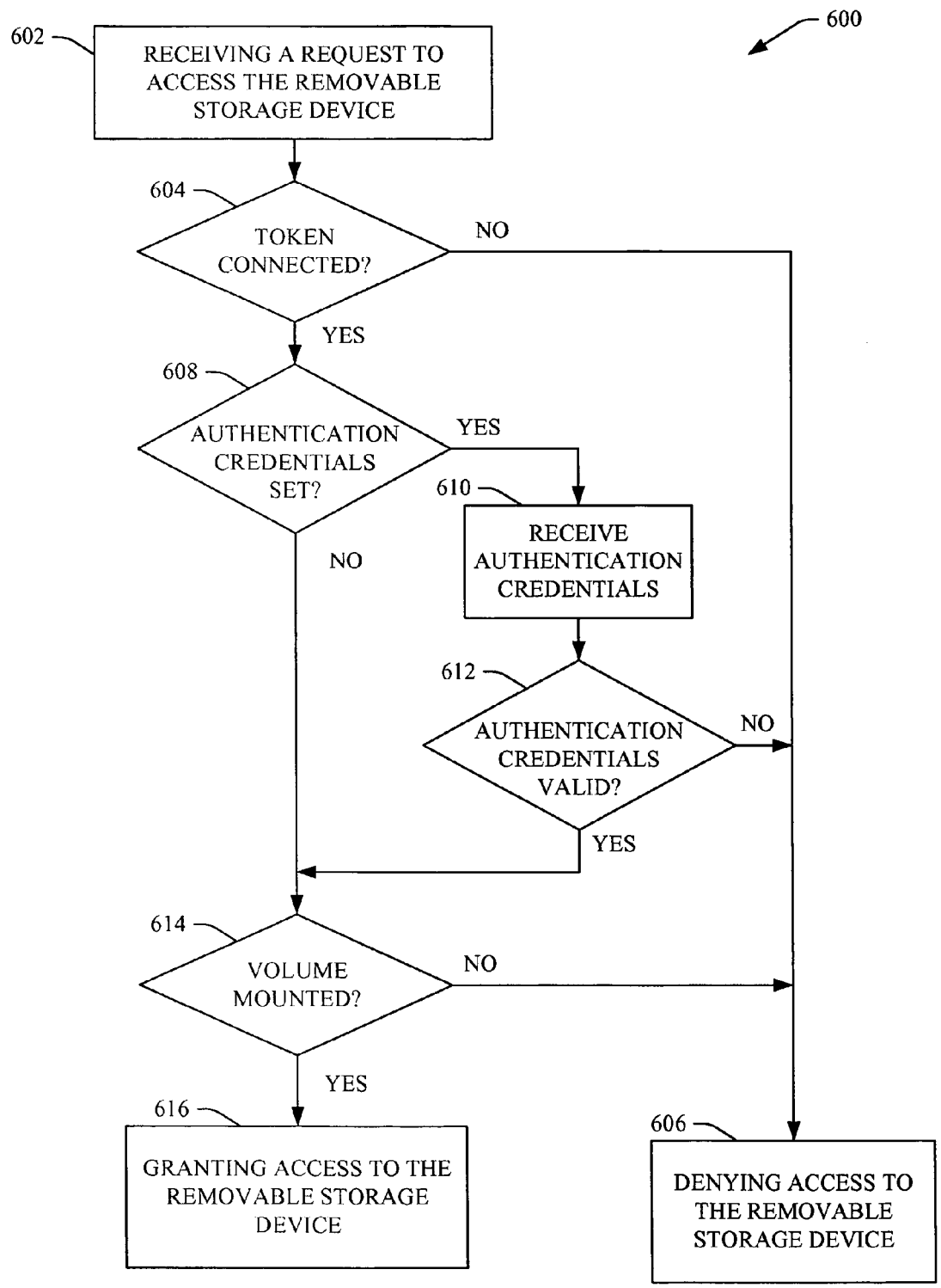
FIG. 6 illustrates a flow diagram of an example method that can employ a token component to control access to a removable storage device in accordance with an aspect of the disclosed subject matter.

FIG. 6 depicts an example method 600 that can employ a token component to control access to a removable storage device in accordance with an aspect of the disclosed subject matter. At 602, a request to access the removable storage device can be received. In an aspect, the request to access can be received by the host device from a user via an interface (e.g., keyboard, mouse, voice interface, etc.) on the host device. The request to access can relate to a write command to write data to the removable storage device or a read command to read data from the removable storage device, or an erase command to erase data from the removable storage device, for example.

At 604, a determination can be made regarding whether the token component is connected to the host device. If the token component is not connected to the host device, at 606, access to the removable storage device can be denied. If, at 604, it is determined that the token component is connected to the host device, at 608, a determination can be made as to whether a password has been set. If it is determined that a password has been set, at 610, authentication credentials (e.g., password) can be received. For instance, the host device can receive authentication credentials from the user via a desired interface on the host device. At 612, a determination can be made regarding whether the received authentication credentials are valid. For instance, the token component and/or host device can retrieve stored valid authentication credentials from a data store and can compare the received authentication credentials from the stored authentication credentials, and if they match each other, the received authentication credentials can deemed valid, and if they do not match each other, the received authentication credentials can deemed invalid. If it is determined that the received authentication credentials are invalid, method 600 can proceed to act 606, wherein access to the removable storage device can be denied. Alternatively, as desired, the user can be prompted to enter new authentication credentials, wherein the user can be permitted to attempt to enter the correct authentication credentials up to a predefined maximum number of access attempts, and if valid authentication credentials are not received within the maximum number of access attempts, the token component can lock the user out from accessing removable storage devices secured by the token component for at least a predefined period of time or until the token component has been reset. If, at 612, it is determined that the received authentication credentials are valid, method 600 can proceed to act 614. Referring again to act 608, if it is determined that no password has been set, method 600 can proceed to act 614.

At 614, a determination can be made as to whether the secure volume file for the removable storage device has been mounted. If it is determined that the secure volume file has not been mounted, method 600 can proceed to act 606, wherein access to the removable storage device can be denied. Action can be taken to mount the secure volume file of the removable storage device, and access to the removable storage device can again be attempted, if desired. If, at 614, it is determined that the secure volume file has been mounted, at 616, access to the removable storage device can be granted. In an aspect, as desired, with access granted, data can be written to the removable storage device using the host device, wherein the data can be encrypted and stored in the removable storage device; data can be read from the removable storage device, wherein the data can be retrieved from the removable storage device, decrypted, and provided to the host device; or data can be erased from the removable storage device.

Figure 7:
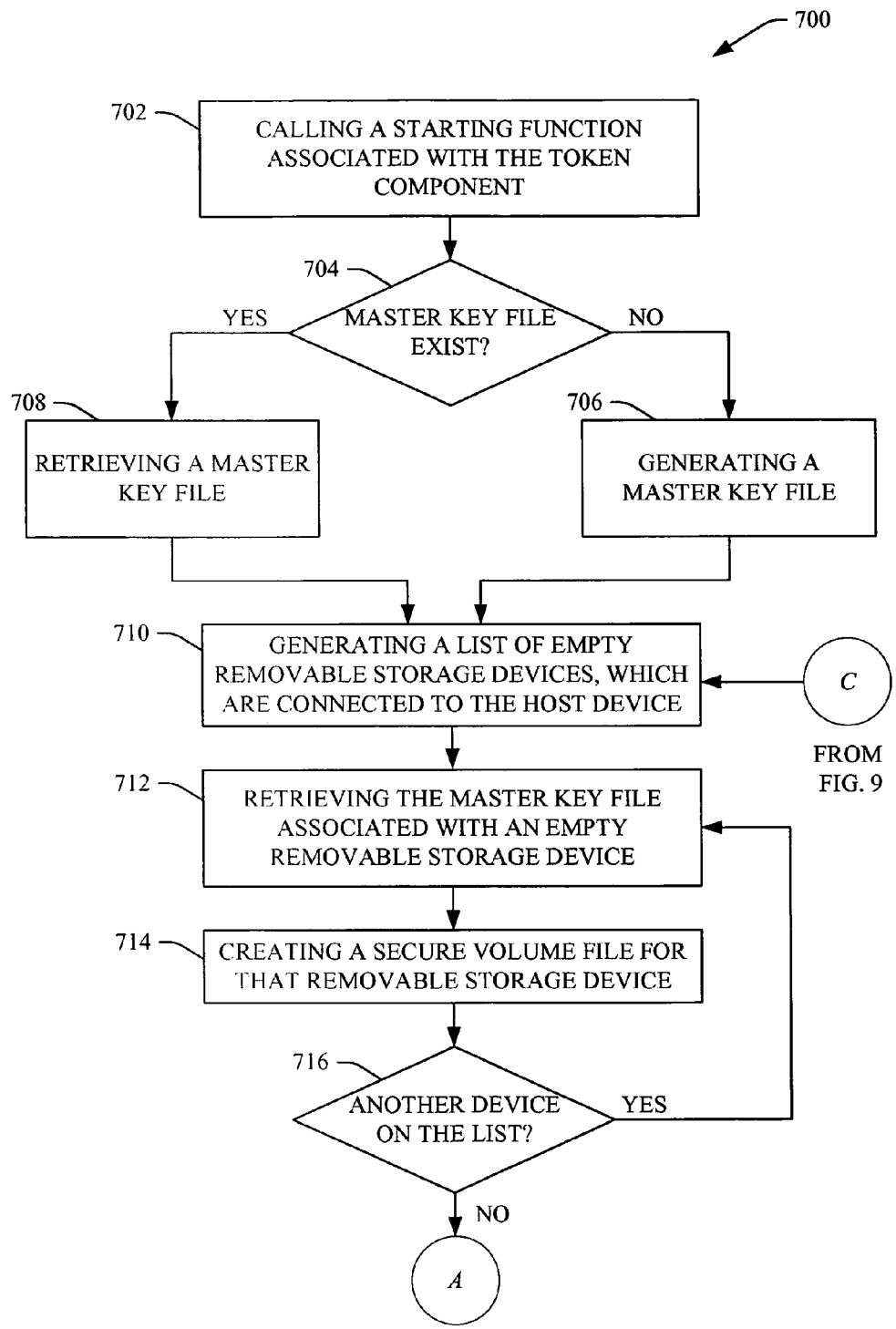
FIGS. 7-9 depict a flow diagram of an example method that can facilitate operation of a token component in accordance with an aspect of the disclosed subject matter.
Figure 8:
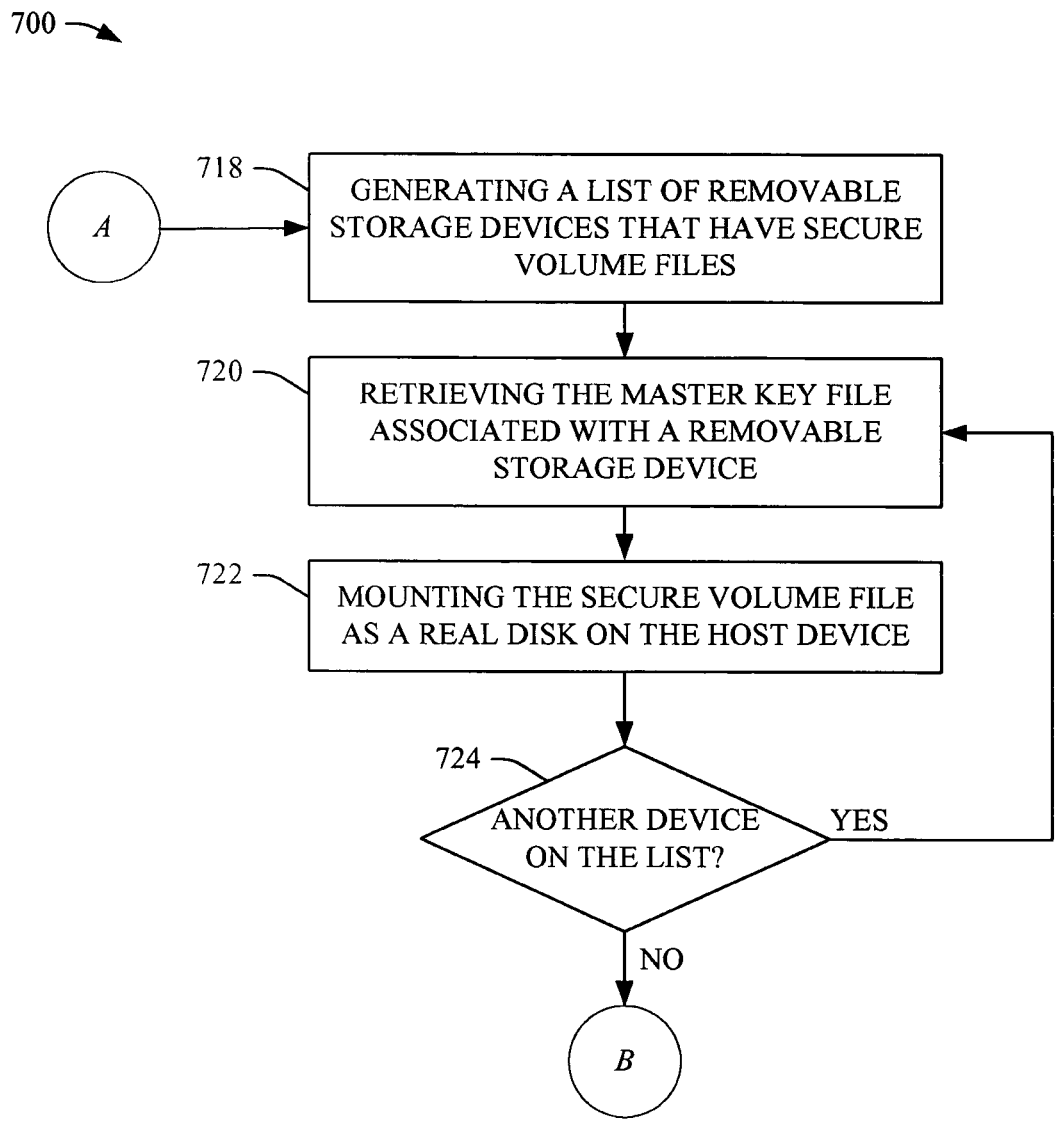
Figure 9:
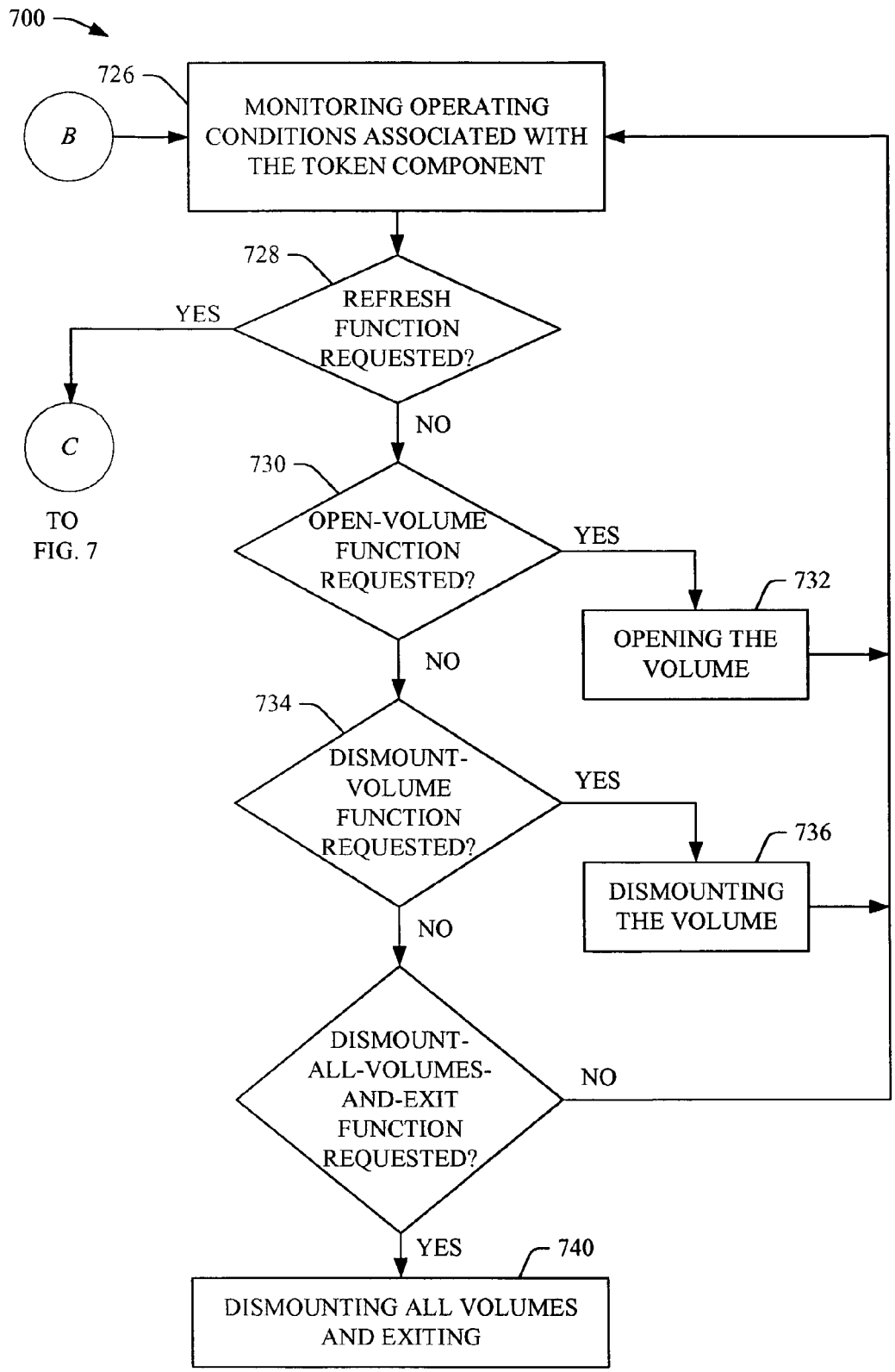

Turning to FIGS. 7, 8, and 9, illustrated is an example method 600 that can facilitate operation of a token component in accordance with an aspect of the disclosed subject matter. FIG. 7 illustrates a portion of an example method 700 that can facilitate operation of a token component in accordance with an aspect of the disclosed subject matter. At 702, a starting function associated with the token component can be called. Execution of the start function can facilitate setting up an operating environment for the token component, such as more fully disclosed herein, for example, with regard to system 100. The starting function can be initiated automatically, for instance, when the security software program of the token component is automatically invoked in response to the token component being inserted into a communication port of the host device and connecting with the host device.

At 704, a determination can be made regarding whether a master key file exists. The token component can examine one or more removable storage devices connected to the host device to determine or identify whether any of the removable storage devices have a master key file stored thereon. If no master key file is identified or located, at 706, a master key file can be generated. If, at act 704, a master key file is identified or located, at 708, the master key file can be retrieved. At this point, method 700 can proceed to act 710.

At 710, a list of empty removable storage devices, which are connected to the host device, can be generated. The token component can manage each of the empty removable storage devices on the list one at a time. At 712, for each empty removable storage device on the list (starting with the first empty removable storage device on the list), the master key file associated with the empty removable storage device can be retrieved. At 714, for each empty removable storage device on the list (starting with the first empty removable storage device on the list), a secure volume file can be created. At 716, a determination can be made regarding whether there are any other empty removable storage devices on the list. If there is another empty removable storage device on the list, method 700 can return to act 712, and method 700 can proceed from that point until secure volume files have been created for all, or at least a desired portion, of the empty removable storage devices on the list of empty removable storage devices. Method 700 can proceed to reference point A, wherein method 700 can continue as more fully disclosed with regard to FIG. 8.

FIG. 8 depicts a portion of an example method 700 that can facilitate operation of a token component in accordance with an aspect of the disclosed subject matter. At this point method 700 can continue to proceed from reference point A (as disclosed with regard to method 700 of FIG. 7). At 718, a list of removable storage devices that have secure volume files can be generated. The token component can manage each of the removable storage devices on the list of removable storage devices that have secure volume files one at a time, wherein each of the removable storage devices can be associated with a respective master key file.

At 720, for each removable storage device on the list of removable storage devices that have secure volume files (starting with the first removable storage device on the list of removable storage devices that have secure volume files), the master key file associated with the removable storage device can be retrieved. At 722, for each removable storage device on the list of removable storage devices that have secure volume files (starting with the first empty removable storage device on the list of removable storage devices that have secure volume files), the secure volume file can be mounted as a real disk on the host device. At 724, a determination can be made regarding whether there are any other removable storage devices on the list of removable storage devices that have secure volume files. If there is another removable storage device on the list of removable storage devices that have secure volume files, method 700 can return to act 720, and method 700 can proceed from that point until secure volume files have been mounted for all, or at least a desired portion, of the removable storage devices on the list of removable storage devices that have secure volume files. At this point, method 700 can proceed to reference point B, wherein method 700 can continue as more fully disclosed with regard to FIG. 9.

FIG. 9 illustrates a portion of an example method 700 that can facilitate operation of a token component in accordance with an aspect of the disclosed subject matter. At this point method 700 can continue to proceed from reference point B (as disclosed with regard to method 700 of FIG. 8). At 726, operating conditions associated with the token component can be monitored. For instance, operating conditions can be monitored to facilitate determining whether one or more functions of the token component have been requested, for example, by selection of a function by a user, which can be received by selection of the desired function (e.g., icon representation of the desired function) in a taskbar menu.

At 728, a determination can be made regarding whether a refresh function has been requested. The token component can monitor and detect whether the refresh function has been selected in the taskbar menu by a user requesting a refresh be performed. A refresh can or may be requested, for example, when the user has connected a new removable storage device to the host device after the token component has already been set up and operating. If a refresh function has been requested, method 700 can proceed to reference point C, wherein method 700 can return to act 710, as shown in FIG. 7, and method 700 can proceed from that point to generate a list of empty removable storage devices, which are connected to the host device and continue from there.

If, at 728, it is determined that the refresh function has not been requested, at 730, a determination can be made regarding whether an open-volume function has been requested. An open-volume function can or may be requested, for example, when the user desires to open a mounted volume associated with a desired removable storage device. The user can make a request for the open-volume function to be performed, for example, by selecting the open-volume icon in the taskbar menu. The user can or may request that a desired mounted volume be opened, for instance, when the user desires to write data to, read data from, or erase data from, the removable storage device. If an open-volume function has been requested, at 732, the desired mounted volume can be opened, wherein the opened mounted volume can be accessed. At this point, method 700 can return to act 726, wherein operating conditions associated with the token component can continue to be monitored.

If, at 730, it is determined that an open-volume function has not been requested, at 734, a determination can be made regarding whether a dismount-volume function has been requested. A dismount-volume function can or may be requested, for example, when the user desires to dismount a mounted volume associated with a desired removable storage device to remove or disconnect the removable storage device from the host device. The user can make a request for the dismount-volume function to be performed, for example, by selecting the dismount-volume icon in the taskbar menu. If a dismount-volume function has been requested, at 736, the desired mounted volume can be dismounted. As desired, the dismounted removable storage device can be disconnected, or at least cannot be opened until it has been mounted again. At this point, method 700 can return to act 726, wherein operating conditions associated with the token component can continue to be monitored.

If, at 734, it is determined that a dismount-volume function has not been requested, at 738, a determination can be made regarding whether a dismount-all-volumes-and-exit function has been requested. A dismount-all-volumes-and-exit function can or may be requested, for example, when the user desires to dismount all mounted volumes associated with all removable storage devices connected to the host device to remove or disconnect the removable storage devices from the host device, and the user desires to end operations of the token component (e.g., end the software program being executed during operation of the token component). The user can make a request for the dismount-all-volumes-and-exit function to be performed, for example, by selecting the dismount-all-volumes-and-exit icon in the taskbar menu. If a dismount-all-volumes-and-exit function has been requested, at 740, all of the mounted volumes can be dismounted and the program can be exited. As desired, the dismounted removable storage devices can be disconnected, or at least cannot be opened until being mounted again. If, at 738, it is determined that a dismount-all-volumes-and-exit function has not been requested, method 700 can return to act 726, wherein operating conditions associated with the token component can continue to be monitored.

Figure 10:
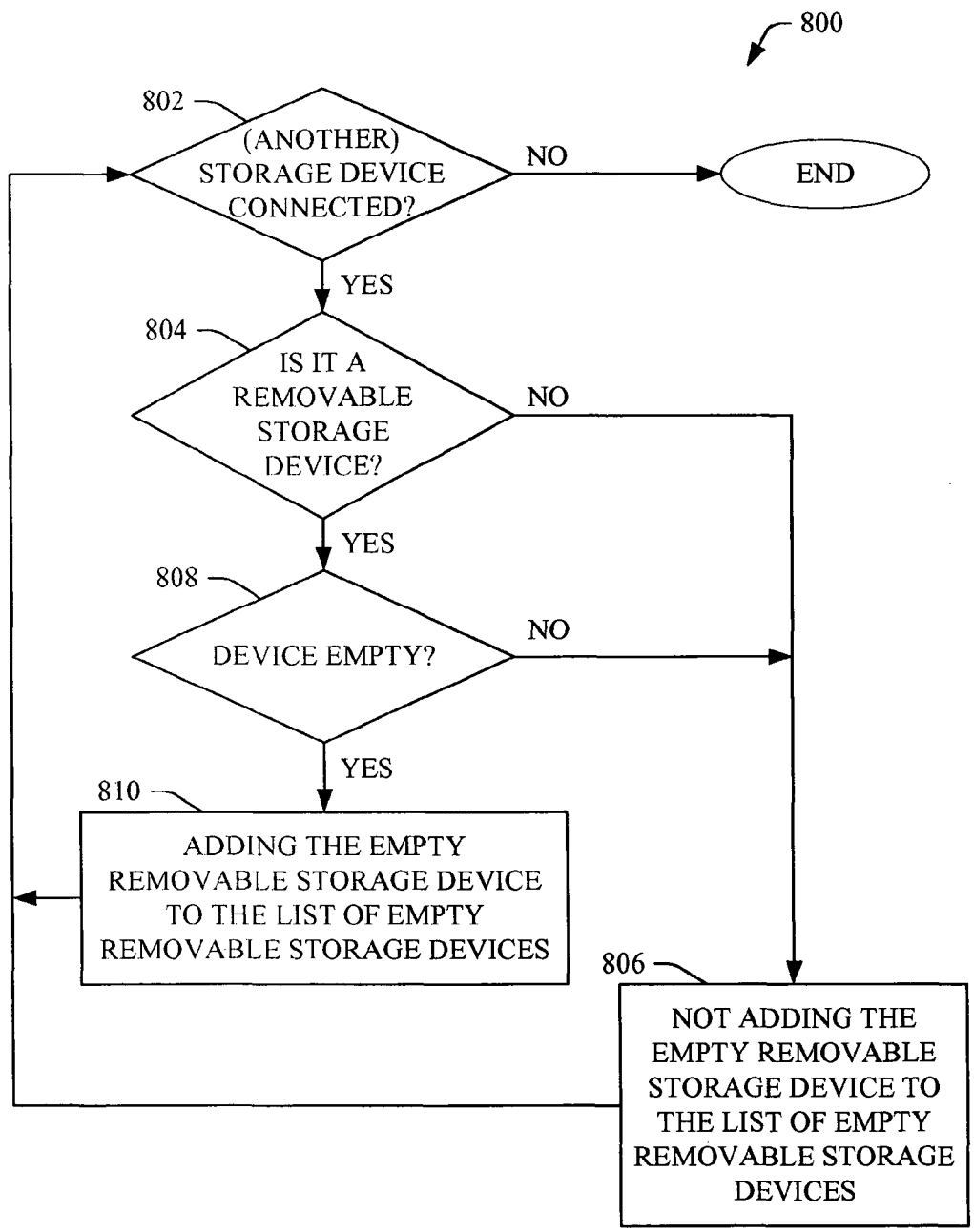
FIG. 10 depicts a flow diagram of an example method for generating a list of empty removable storage devices connected to a host device in accordance with an embodiment of the disclosed subject matter.

FIG. 10 depicts an example method 800 for generating a list of empty removable storage devices connected to a host device in accordance with an embodiment of the disclosed subject matter. At 802, a determination can be made regarding whether a storage device is detected as being connected to the host device. The token component can examine each storage device and/or communication port associated with a host device to facilitate identifying empty removable storage devices to be added to a list of empty removable storage devices connected to the host device. If no storage device is detected as being connected to the host device, method 800 can end. Alternatively, a message indicating an error or indicating that no storage devices have been detected can be presented to the user via a display screen on the host device.

If, at 802, a storage device is detected as being connected to the host device, at 804, for each storage device connected to the host device, a determination can be made regarding whether the detected storage device is a removable storage device. If it is determined that the detected storage device is not a removable storage device, at 806, that storage device is not added to the list, and method 800 can return to act 802, wherein method 800 can proceed to determine whether there is another storage device detected as being connected to the host device.

If, at 804, it is determined that the detected storage device is a removable storage device, at 808, a determination can be made as to whether the removable storage device is an empty removable storage device. If it is determined that the removable storage device is not empty, method 800 can proceed to act 806, wherein that removable storage device is not added to the list, and method 800 can return to act 802, wherein method 800 can proceed to determine whether there is another storage device detected as being connected to the host device.

If, at 808, it is determined that the removable storage device is empty, at 810, the empty removable storage device can be added to the list of empty removable storage devices. At this point, method 800 can return to act 802, wherein method 800 can proceed to determine whether there is another storage device detected as being connected to the host device.

Figure 11:
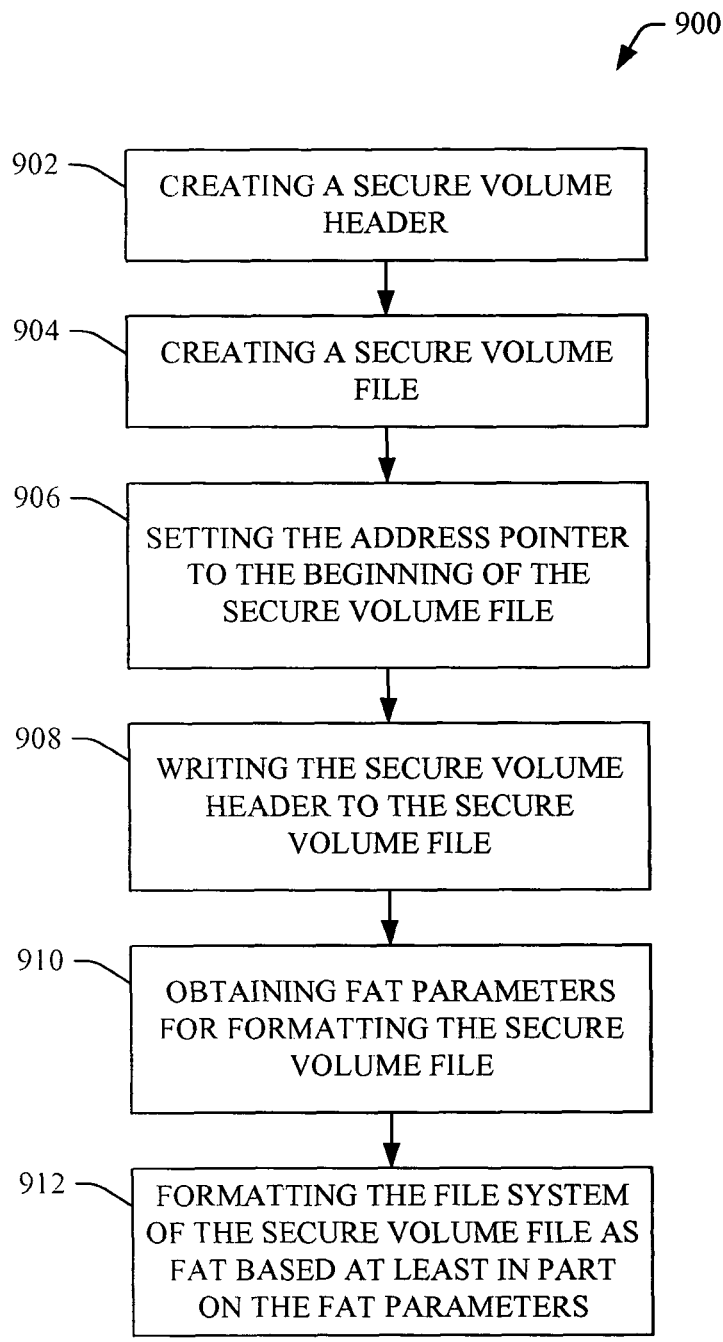
FIG. 11 illustrates a flow diagram of an example method for creating a secure volume file for an empty removable storage device in accordance with another embodiment of the disclosed subject matter.

FIG. 11 illustrates an example method 900 for creating a secure volume file for an empty removable storage device in accordance with another embodiment of the disclosed subject matter. At 902, a secure volume header can be created. For instance, a desired create-volume-header function, such as CreateVolumeHeaderInMemory ( ), can be called to facilitate creating a secure volume header for the secure volume file. At 904, the secure volume file can be created. For instance, the token component can call a desired file-creation function, such as CreateFile ( ), to create the secure volume file handler, a desired set-file function, such as SetFilePointerEx ( ), and a desired set-end-of-file function, such as SetEndOfFile ( ), to set the size of the secure volume file, wherein the file size can be equal to the maximum size, or desired portion thereof, the removable storage device.

At 906, the address pointer can be set to the beginning of the secure volume file. For instance, the token component can call a desired set-address-pointer function, such as SetFilePointer ( ), to set the address pointer can be set to the beginning of the secure volume file. At 908, the secure volume header can be written to the secure volume file. In an aspect, the token component can call a desired write function, such as _lwrite ( ), to write the secure volume header to the secure volume file.

At 910, FAT parameters can be obtained for formatting the secure volume file. In an aspect, the token component can call a desired get-FAT-parameters function, such as GetFatParams ( ), to obtain the FAT parameters, which can be employed to format the secure volume file. At 912, the file system of the secure volume file can be formatted as FAT based at least in part on the FAT parameters. The token component can call a desired format-file function, such as FormatFat ( ), to format the secure volume file as FAT.

It is to be appreciated and understood that components (e.g., storage device, host device, token component, security component, etc.), as described with regard to a particular system or method, can include the same or similar functionality as respective components (e.g., respectively named components) as described with regard to other systems or methods disclosed herein.

As utilized herein, terms "component," "system,", "interface", "device", and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (NVRAM) (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates securing data associated with one or more removable storage devices, comprising:
a token component associated with a key value, wherein the token component is configured to be communicatively connectable to a host device and is distinct from one or more removable storage devices respectively associated with a master key file; and a security component that is configured to control access to the one or more removable storage devices based at least in part on a communicative connection state of the token component in relation to the host device and satisfaction of a rule related to comparing the key value and the master key file, wherein the one or more removable storage devices are configured to be communicatively connectable to the host device and to store or provide data.

2. The system of claim 1, wherein the security component is further configured to control access to deny access to at least one removable storage device of the one or more removable storage devices when the security component is not communicatively connected to the host device.

3. The system of claim 1, wherein the security component is further configured to encrypt data written to, or decrypt data read from, at least one removable storage device of the one or more removable storage devices when the security component is communicatively connected to the host device and the at least one removable storage device is mounted as a real disk on the host device.

4. The system of claim 1, wherein the security component is further configured to determine whether the master key file exists for any of the one or more removable storage devices and generate the master key file when the master key file does not exist.

5. The system of claim 1, wherein the security component is further configured to identify the one or more removable storage devices that are empty and are communicatively connected to the host device and generate a list of the one or more empty removable storage devices.

6. The system of claim 5, wherein, for at least a portion of the one or more removable storage devices in the list of the one or more empty removable storage devices, the security component is further configured to retrieve a respective master key value from the master key file and respectively generate a secure volume file for removable storage devices that are in the portion of the one or more removable storage devices in the list of the one or more empty removable storage devices.

7. The system of claim 6, wherein the security component is further configured to identify the one or more removable storage devices that have respective secure volume files and are communicatively connected to the host device and generate a list of the one or more removable storage devices having respective secure volume files.

8. The system of claim 7, wherein, for at least a portion of the one or more removable storage devices in the list of the one or more removable storage devices having respective secure volume files, the security component is further configured to retrieve a respective master key value from the master key file and respectively mount the at least a portion of the one or more removable storage devices as one or more real disks on the host device.

9. The system of claim 1, wherein the security component is further configured to receive valid authentication credentials from a user to set a valid authentication value for the token component; and, when access to the token component or the one or more removable storage devices is attempted, the security component is further configured to receive authentication credentials and control access to the token component or the one or more removable storage devices based at least in part on the received authentication credentials, the valid authentication value, and the communicative connection state of the token component in relation to the host device.

10. The system of claim 1, further comprising:
the host device comprising one of a computer, a mobile phone, a netbook, a personal digital assistant (PDA), an electronic reading device, a set-top box, an Internet Protocol Television (IPTV), or an electronic gaming console.

11. The system of claim 1, further comprising:
the one or more removable storage devices, comprising at least one of flash memory, read only memory (ROM), programmable ROM (PROM), electrically programmable ROM (EPROM), electrically erasable ROM (EEPROM), phase change memory (PCM), or nonvolatile random access memory (NVRAM).

12. A method, comprising:
configuring, by a system comprising a processor, a token component comprising a key value to be communicatively connectable to and removable from a host device; and
controlling access to one or more removable storage drives not comprising the token component based at least in part on a communicative connection state of the token component in relation to the host device and determining satisfaction of a rule associated with comparing the key value to a master key value stored on each of the one or more removable storage drives.

13. The method of claim 12, further comprising:
communicatively connecting the one or more removable storage drives to the host device; and
at least one of encrypting data written to at least one removable storage drive of the one or more removable storage drives or decrypting data read from the at least one removable storage drive when the at least one removable storage drive is mounted as a real disk on the host device and the token component is communicatively connected to the host device.

14. The method of claim 12, further comprising:
receiving a request to access at least one removable storage drive of the one or more removable storage drives;
determining whether the token component is communicatively connected to the host device; and
denying access to the at least one removable storage drive when it is determined that the token component is not communicatively connected to the host device.

15. The method of claim 14, further comprising:
determining whether a secure volume file for the at least one removable storage device is mounted as a real disk on the host device, when it is determined that the token component is communicatively connected to the host device;
at least one of:
granting access to the at least one removable storage drive when it is determined that the secure volume file is mounted as a real disk on the host device, or
denying access to the at least one removable storage drive when it is determined that the secure volume file is not mounted as a real disk on the host device.

16. The method of claim 12, further comprising:
scanning at least a portion of all drives associated with the host device;
identifying one or more drives that are empty removable storage drives;
generating a list of the empty removable storage drives.

17. The method of claim 16, further comprising:
generating one or more secure volume files for one or more empty removable storage drives on the list of the empty removable storage drives;

scanning at least a portion of all drives associated with the host device;

identifying one or more removable storage drives that respectively contain the one or more secure volume files; and mounting the one or more removable storage drives respectively as real disks on the host device.

18. The method of claim 12, further comprising:

receiving a request to access at least one removable storage drive of the one or more removable storage drives;

identifying whether valid authentication credentials are required to access the at least one removable storage drive;

receiving authentication credentials when valid authentication credentials are required.

19. A non-transitory computer readable storage device having executable instructions stored thereon that, in response to execution, cause a device comprising a processor to perform operations, comprising:

configuring a token component associated with a key value to be connectable to and removable from a host device; and controlling access to one or more removable storage devices associated with a master key value and not comprising the token component based at least in part on a connection state of the token component in relation to the host device and determining that a rule related to comparing the key value and the master key value is satisfied.

20. The non-transitory computer readable storage device of claim 19, wherein the operations further comprise:

encrypting data written to at least one removable storage device of the one or more removable storage devices when the token component is connected to the host device and the at least one removable storage device is mounted as a real disk on the host device; or decrypting data read from the at least one removable storage device, wherein when the token component is connected to the host device and the at least one removable storage device is mounted as a real disk on the host device.

* * * * *